(12) United States Patent
Joglekar et al.

(10) Patent No.: US 9,137,210 B1
(45) Date of Patent: Sep. 15, 2015

(54) REMOTE BROWSING SESSION MANAGEMENT

(75) Inventors: Sachin P. Joglekar, Bothell, WA (US); Peter S. Vosshall, Bainbridge Island, WA (US); Jonathan A. Jenkins, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 13/401,763

(22) Filed: Feb. 21, 2012

(51) Int. Cl.
*H04L 29/06* (2006.01)
*H04L 12/911* (2013.01)

(52) U.S. Cl.
CPC ............ *H04L 63/0272* (2013.01); *H04L 63/10* (2013.01); *H04L 63/20* (2013.01); *H04L 47/70* (2013.01)

(58) Field of Classification Search
None
See application file for complete search history.

(56) References Cited

U.S. PATENT DOCUMENTS

| | | | |
|---|---|---|---|
| 5,634,064 A | 5/1997 | Warnock et al. | |
| 5,872,850 A | 2/1999 | Klein et al. | |
| 5,961,593 A * | 10/1999 | Gabber et al. | 709/219 |
| 6,049,812 A | 4/2000 | Bertram et al. | |
| 6,108,637 A * | 8/2000 | Blumenau | 715/204 |
| 6,138,156 A | 10/2000 | Fletcher et al. | |
| 6,195,679 B1 | 2/2001 | Bauersfeld et al. | |
| 6,430,624 B1 | 8/2002 | Jamtgaard et al. | |
| 6,549,941 B1 * | 4/2003 | Jaquith et al. | 709/219 |
| 6,560,620 B1 | 5/2003 | Ching | |
| 6,560,705 B1 * | 5/2003 | Perlman et al. | 713/154 |
| 6,625,624 B1 * | 9/2003 | Chen et al. | 1/1 |
| 6,704,024 B2 | 3/2004 | Robotham et al. | |
| 6,785,864 B1 | 8/2004 | Te et al. | |
| 6,842,777 B1 * | 1/2005 | Tuli | 709/217 |
| 6,871,236 B2 | 3/2005 | Fishman et al. | |
| 6,944,665 B2 | 9/2005 | Brown et al. | |
| 6,963,850 B1 | 11/2005 | Bezos et al. | |

(Continued)

FOREIGN PATENT DOCUMENTS

WO      WO 2013/003631 A2      1/2013

OTHER PUBLICATIONS

Ogara ("Amazon Gives Virtual Private Clouds Internet Access", found at http://web2.sys-con.com/node/1759026/, Mar. 2011).*

(Continued)

*Primary Examiner* — Peter Poltorak
(74) *Attorney, Agent, or Firm* — Knobbe, Martens, Olson & Bear, LLP

(57) ABSTRACT

A browsing process is directed to the generation and management of a browse session at a network computing provider. A client computing device transmits secure requests for network resources to a network computing provider. The network computing provider comprises one or more virtual network computing providers for processing secure communications between a client computing device and a content source. A virtual network computing provider handles the secure communications, decrypting and processing the communications while preventing third parties from accessing the unencrypted communication data. The virtual network computing provider may determine a browse configuration identifying processing actions to perform on the request content. The virtual network computing provider may retrieve the requested content, perform a first set of processing actions to generate a processing result, and provide the processing result to the client computing device, which may perform a second set of processing actions, including display.

20 Claims, 18 Drawing Sheets

(56) References Cited

U.S. PATENT DOCUMENTS

| | | | |
|---|---|---|---|
| 6,976,059 B1* | 12/2005 | Rogalski et al. | 709/218 |
| 6,996,628 B2* | 2/2006 | Keane et al. | 709/238 |
| 7,003,442 B1 | 2/2006 | Tsuda | |
| 7,051,084 B1* | 5/2006 | Hayton et al. | 709/219 |
| 7,054,952 B1 | 5/2006 | Schwerdtfeger et al. | |
| 7,085,736 B2 | 8/2006 | Keezer et al. | |
| 7,124,203 B2* | 10/2006 | Joshi et al. | 709/248 |
| 7,159,023 B2 | 1/2007 | Tufts | |
| 7,171,478 B2 | 1/2007 | Lueckhoff et al. | |
| 7,191,211 B2 | 3/2007 | Tuli | |
| 7,246,174 B2* | 7/2007 | Sciandra et al. | 709/244 |
| 7,260,841 B2* | 8/2007 | Tenereillo | 726/15 |
| 7,353,252 B1 | 4/2008 | Yang et al. | |
| 7,373,313 B1 | 5/2008 | Kahle et al. | |
| 7,409,719 B2* | 8/2008 | Armstrong et al. | 726/24 |
| 7,441,045 B2* | 10/2008 | Skene et al. | 709/241 |
| 7,543,059 B2 | 6/2009 | Johnson et al. | |
| 7,707,136 B2* | 4/2010 | Vosshall et al. | 707/695 |
| 7,724,732 B2* | 5/2010 | Guichard et al. | 370/389 |
| 7,792,944 B2 | 9/2010 | DeSantis et al. | |
| 7,793,220 B1* | 9/2010 | Liang et al. | 715/738 |
| 7,831,582 B1 | 11/2010 | Scofield et al. | |
| 7,865,528 B2* | 1/2011 | Neil | 707/793 |
| 7,865,586 B2* | 1/2011 | Cohn | 709/223 |
| 7,941,450 B2* | 5/2011 | Hulaj et al. | 707/793 |
| 7,975,000 B2 | 7/2011 | Dixon et al. | |
| 7,984,170 B1* | 7/2011 | Shalla et al. | 709/229 |
| 7,991,859 B1* | 8/2011 | Miller et al. | 709/220 |
| 7,996,912 B2 | 8/2011 | Spalink et al. | |
| 8,010,545 B2 | 8/2011 | Stefik et al. | |
| 8,010,679 B2* | 8/2011 | Low et al. | 709/227 |
| 8,015,343 B2* | 9/2011 | Garman et al. | 711/100 |
| 8,015,496 B1 | 9/2011 | Rogers | |
| 8,051,166 B1* | 11/2011 | Baumback et al. | 709/224 |
| 8,051,180 B2* | 11/2011 | Mazzaferri et al. | 709/227 |
| 8,060,463 B1 | 11/2011 | Spiegel | |
| 8,073,850 B1 | 12/2011 | Hubbard et al. | |
| 8,103,742 B1 | 1/2012 | Green | |
| 8,117,289 B1* | 2/2012 | Miller et al. | 709/220 |
| 8,117,314 B2* | 2/2012 | Croft et al. | 709/227 |
| 8,185,621 B2 | 5/2012 | Kasha | |
| 8,249,904 B1 | 8/2012 | DeSantis et al. | |
| 8,271,887 B2 | 9/2012 | Offer et al. | |
| 8,316,124 B1 | 11/2012 | Baumback et al. | |
| 8,336,049 B2 | 12/2012 | Medovich | |
| 8,660,129 B1* | 2/2014 | Brendel et al. | 370/397 |
| 8,886,777 B2* | 11/2014 | Salsbury | 709/222 |
| 2001/0039490 A1 | 11/2001 | Verbitsky et al. | |
| 2002/0030703 A1* | 3/2002 | Robertson et al. | 345/853 |
| 2002/0059402 A1* | 5/2002 | Belanger | 709/220 |
| 2002/0069369 A1 | 6/2002 | Tremain | 713/201 |
| 2002/0099738 A1* | 7/2002 | Grant | 707/513 |
| 2002/0107985 A1* | 8/2002 | Hwang et al. | 709/246 |
| 2002/0116494 A1* | 8/2002 | Kocol | 709/224 |
| 2002/0194302 A1* | 12/2002 | Blumberg | 709/217 |
| 2003/0023712 A1 | 1/2003 | Zhao et al. | |
| 2003/0041106 A1* | 2/2003 | Tuli | 709/203 |
| 2003/0229697 A1* | 12/2003 | Borella | 709/226 |
| 2004/0083294 A1 | 4/2004 | Lewis | |
| 2004/0139208 A1* | 7/2004 | Tuli | 709/230 |
| 2004/0181613 A1* | 9/2004 | Hashimoto et al. | 710/1 |
| 2004/0205448 A1 | 10/2004 | Grefenstette et al. | |
| 2004/0220905 A1 | 11/2004 | Chen et al. | |
| 2004/0243622 A1 | 12/2004 | Morisawa | |
| 2005/0010863 A1 | 1/2005 | Zernik | |
| 2005/0060643 A1 | 3/2005 | Glass et al. | |
| 2005/0138382 A1 | 6/2005 | Hougaard et al. | |
| 2005/0165953 A1* | 7/2005 | Oba et al. | 709/238 |
| 2005/0183039 A1 | 8/2005 | Revis | |
| 2005/0188361 A1* | 8/2005 | Cai et al. | 717/148 |
| 2005/0246193 A1 | 11/2005 | Roever et al. | |
| 2005/0289540 A1* | 12/2005 | Nguyen et al. | 718/1 |
| 2006/0085766 A1 | 4/2006 | Dominowska et al. | |
| 2006/0095336 A1 | 5/2006 | Heckerman et al. | |
| 2006/0122889 A1 | 6/2006 | Burdick et al. | |
| 2006/0168510 A1 | 7/2006 | Bryar et al. | |
| 2006/0184421 A1 | 8/2006 | Lipsky et al. | |
| 2006/0248442 A1 | 11/2006 | Rosenstein et al. | |
| 2006/0277167 A1 | 12/2006 | Gross et al. | |
| 2006/0294461 A1 | 12/2006 | Nadamoto et al. | |
| 2007/0022072 A1 | 1/2007 | Kao et al. | |
| 2007/0027672 A1 | 2/2007 | Decary et al. | |
| 2007/0079307 A1* | 4/2007 | Dhawan et al. | 718/1 |
| 2007/0094241 A1 | 4/2007 | M. Blackwell et al. | |
| 2007/0124693 A1 | 5/2007 | Dominowska et al. | |
| 2007/0139430 A1 | 6/2007 | Korn et al. | |
| 2007/0240160 A1* | 10/2007 | Paterson-Jones et al. | 718/104 |
| 2007/0288589 A1 | 12/2007 | Chen et al. | |
| 2008/0028334 A1 | 1/2008 | De Mes | |
| 2008/0104502 A1 | 5/2008 | Olston | |
| 2008/0183672 A1 | 7/2008 | Canon et al. | |
| 2008/0184128 A1 | 7/2008 | Swenson et al. | |
| 2008/0201414 A1* | 8/2008 | Amir Husain et al. | 709/203 |
| 2008/0215681 A1* | 9/2008 | Darcie et al. | 709/204 |
| 2008/0301225 A1* | 12/2008 | Kamura | 709/203 |
| 2008/0320225 A1 | 12/2008 | Panzer et al. | |
| 2009/0012969 A1 | 1/2009 | Rail et al. | |
| 2009/0164924 A1 | 6/2009 | Flake et al. | |
| 2009/0185500 A1* | 7/2009 | Mower et al. | 370/250 |
| 2009/0204478 A1 | 8/2009 | Kaib et al. | |
| 2009/0204964 A1* | 8/2009 | Foley et al. | 718/1 |
| 2009/0217199 A1 | 8/2009 | Hara et al. | |
| 2009/0248680 A1* | 10/2009 | Kalavade | 707/5 |
| 2009/0254867 A1 | 10/2009 | Farouki et al. | |
| 2009/0282021 A1 | 11/2009 | Bennett | |
| 2009/0287698 A1 | 11/2009 | Marmaros et al. | |
| 2009/0327914 A1 | 12/2009 | Adar et al. | |
| 2010/0027552 A1* | 2/2010 | Hill | 370/401 |
| 2010/0036740 A1 | 2/2010 | Barashi | |
| 2010/0042636 A1* | 2/2010 | Lu | 707/100 |
| 2010/0057639 A1 | 3/2010 | Schwarz et al. | |
| 2010/0115606 A1* | 5/2010 | Samovskiy et al. | 726/15 |
| 2010/0125507 A1 | 5/2010 | Tarantino, III et al. | |
| 2010/0131594 A1 | 5/2010 | Kashimoto | |
| 2010/0138293 A1 | 6/2010 | Ramer et al. | |
| 2010/0186079 A1* | 7/2010 | Nice et al. | 726/14 |
| 2010/0218106 A1 | 8/2010 | Chen et al. | |
| 2010/0251282 A1* | 9/2010 | Howcroft | 725/25 |
| 2010/0293190 A1 | 11/2010 | Kaiser et al. | |
| 2010/0306379 A1* | 12/2010 | Ferris | 709/226 |
| 2010/0312788 A1 | 12/2010 | Bailey | |
| 2010/0318892 A1 | 12/2010 | Teevan et al. | |
| 2010/0325287 A1* | 12/2010 | Jagadeeswaran et al. | 709/227 |
| 2010/0332513 A1 | 12/2010 | Azar et al. | |
| 2011/0022957 A1 | 1/2011 | Lee | |
| 2011/0029854 A1 | 2/2011 | Nashi et al. | |
| 2011/0055203 A1* | 3/2011 | Gutt et al. | 707/722 |
| 2011/0055398 A1* | 3/2011 | Dehaan et al. | 709/226 |
| 2011/0078140 A1 | 3/2011 | Dube et al. | |
| 2011/0078705 A1 | 3/2011 | Maclinovsky et al. | |
| 2011/0119661 A1 | 5/2011 | Agrawal et al. | |
| 2011/0161849 A1 | 6/2011 | Stallings et al. | |
| 2011/0173177 A1 | 7/2011 | Junqueira et al. | |
| 2011/0173637 A1 | 7/2011 | Brandwine et al. | |
| 2011/0178868 A1 | 7/2011 | Garg et al. | |
| 2011/0185025 A1 | 7/2011 | Cherukuri et al. | |
| 2011/0185355 A1* | 7/2011 | Chawla et al. | 718/1 |
| 2011/0191327 A1 | 8/2011 | Lee | |
| 2011/0197121 A1 | 8/2011 | Kletter | |
| 2011/0231899 A1* | 9/2011 | Pulier et al. | 726/1 |
| 2011/0246873 A1 | 10/2011 | Tolle et al. | |
| 2011/0261828 A1* | 10/2011 | Smith | 370/401 |
| 2011/0289074 A1 | 11/2011 | Leban | |
| 2011/0296341 A1 | 12/2011 | Koppert | |
| 2011/0302510 A1 | 12/2011 | Harrison et al. | |
| 2011/0314145 A1* | 12/2011 | Raleigh et al. | 709/224 |
| 2011/0320598 A1* | 12/2011 | Solin | 709/225 |
| 2012/0072821 A1 | 3/2012 | Bowling | |
| 2012/0084644 A1 | 4/2012 | Robert et al. | |
| 2012/0096269 A1* | 4/2012 | McAlister | 713/171 |
| 2012/0096365 A1 | 4/2012 | Wilkinson et al. | |
| 2012/0110017 A1 | 5/2012 | Gu et al. | |
| 2012/0117565 A1* | 5/2012 | Staelin et al. | 718/1 |
| 2012/0137201 A1 | 5/2012 | White et al. | |

(56) References Cited

U.S. PATENT DOCUMENTS

| | | | |
|---|---|---|---|
| 2012/0143944 A1 | 6/2012 | Reeves et al. | |
| 2012/0150844 A1 | 6/2012 | Lindahl et al. | |
| 2012/0166922 A1 | 6/2012 | Rolles | |
| 2012/0198516 A1* | 8/2012 | Lim | 726/1 |
| 2012/0210379 A1* | 8/2012 | McCoy et al. | 725/109 |
| 2012/0215834 A1* | 8/2012 | Chen et al. | 709/203 |
| 2012/0215919 A1 | 8/2012 | Labat et al. | |
| 2012/0284629 A1 | 11/2012 | Peters et al. | |
| 2012/0290348 A1* | 11/2012 | Hackett et al. | 705/7.13 |
| 2012/0303949 A1* | 11/2012 | Liu et al. | 713/153 |
| 2012/0317295 A1 | 12/2012 | Baird et al. | |
| 2012/0331406 A1 | 12/2012 | Baird et al. | |
| 2013/0007101 A1 | 1/2013 | Trahan et al. | |
| 2013/0007102 A1 | 1/2013 | Trahan et al. | |
| 2013/0031461 A1 | 1/2013 | Hou et al. | |
| 2013/0067550 A1* | 3/2013 | Chen et al. | 726/7 |
| 2013/0080611 A1 | 3/2013 | Li et al. | |
| 2013/0142201 A1* | 6/2013 | Kim et al. | 370/392 |
| 2013/0185715 A1* | 7/2013 | Dunning et al. | 718/1 |

OTHER PUBLICATIONS

Malik (Malik et al., "Virtual Cloud: Rent Out the Rented Resources", 6th International Conference on Internet Technology and Secured Transactions, Dec. 2011).*

Extend Your IT Infrastructure with Amazon Virtual Private Cloud, Amazon Web Services Jan. 2010.*

Miller, "Amazon Launches Virtual Private Cloud", Aug. 2009.*

Vogels, "All Things Distributed", Aug. 2009.*

Rao, H.C.-H.,et al., "A Proxy-Based Personal Web Archiving Service," Operating Systems Review, 35(1):61-72, 2001.

Teevan, J., et al., "Changing How People View Changes on the Web," 2009, Proceedings of the 22$^{nd}$ Annual ACM Symposium on User Interface Software and Technology, New York, 2009, pp. 237-246.

Close 'n' Forget Firefox add on, Evilfantasy's blog, http://evilfantasy.wordpress.com/2009/03/24/close-%E2%80%98n%E2%80%99-forget-firefox-add-on/, retrieved Mar. 24, 2009, 1 page.

Chen, H., et al., "Bringing Order to the Web: Automatically Categorizing Search Results," Proceedings of the SIGCHI Conference on Human Factors in Computing Systems, Apr. 1-6, 2000, pp. 145-152.

Bango, Rey "How JS & Ajax work in Opera Mini 4", Nov. 2, 2007, XP055050107, Retrieved from the Internet.

Brinkmann, M, "Record and Share your browser history with Hooeey," ghacks.net, Feb. 26, 2008, 6 pages, printed on Jan. 25, 2013.

Considine, A, "The Footprints of Web Feet," The New York Times, Mar. 4, 2011, 3 pages, printed on Jan. 25, 2013.

EyeBrowse: Record, Visualize and Share your Browser History, Information Aesthetics, Sep. 18, 2009, 2 pages, printed on Jan. 25, 2013.

Feuerstein, Adam, "Flyswat Takes Aim," San Francisco Business Times, printed from http://www.bizjournals.com/sanfrancisco/stories/1999/10/25/story2.html?t=printable, Oct. 22, 1999, 2 pages.

Gabber et al., "How to Make Personalized Web Browsing Simple, Secure, and Anonymous," Financial Cryptography, 16 pages. (1997).

Gingerich, Jason, "Keycorp Making Site Into Portal," KRTBN Knight-Ridder Tribune Business News (South Bend Tribune, Indiana), Oct. 25, 1999, 2 pages.

Hopper, D. Ian, "Desktops Now Have Power to Comparison-Shop," Oct. 18, 1999, printed from http://www.cnn.com/TECH/computing/9910/18/r.u.sure/index.html, 3 pages.

Van Kleek, M, Introducing "Eyebrowse"—Track and share your web browsing in real time, Haystack Blog, Aug. 28, 2009, 3 pages, printed on Jan. 25, 2013.

Web page titled "RSS Ticker: Add-ons for Firefox," https://addons.mozilla.org/en-US/firefox/addon/rss-ticker/, 3 printed pages, printed on Feb. 7, 2013.

Web pages titled "What Internet Users Do on a Typical Day, Trend Data (Adults), Pew Internet & American Life Project," printed from http://pewinternet.org/Static-Pages/Trend-Data-(Adults)/Online-Activites-Daily.aspx on Nov. 29, 2012, 4 pages.

Baumann, A., et al., Enhancing STEM Classes Using Weave: A Collaborative Web-Based Visualization Environment, Integrated Stem Education Conference, Apr. 2, 2011, Ewing, New Jersey, pp. 2A-1-2A-4.

De Carvalho, L.G., et al., Synchronizing Web Browsing Data With Browserver, Proceedings of the IEEE Symposium on Computers and Communications, Jun. 22-25, 2010, Riccione, Italy, pp. 738-743.

* cited by examiner

REMOTE BROWSING SESSION MANAGEMENT

BACKGROUND

Generally described, computing devices and communication networks can be utilized to exchange information. In a common application, a computing device can request content from another computing device via the communication network. For example, a user at a personal computing device can utilize a software browser application, typically referred to as a browser software application, to request a Web page from a server computing device via the Internet. In such embodiments, the user computing device can be referred to as a client computing device and the server computing device can be referred to as a content provider.

With reference to an illustrative example, a requested Web page, or original content, may be associated with a number of additional resources, such as images or videos, that are to be displayed with the Web page. In one specific embodiment, the additional resources of the Web page are identified by a number of embedded resource identifiers, such as uniform resource locators ("URLs"). In turn, software on the client computing devices, such as a browser software application, typically processes embedded resource identifiers to generate requests for the content. Accordingly, in order to satisfy a content request, one or more content providers will generally provide client computing devices data associated with the Web page as well as the data associated with the embedded resources.

Once the client computing device obtains the Web page and associated additional resources, the content may be processed in a number of stages by the software browser application or other client computing device interface. For example, and with reference to the above illustration, the software browser application may parse the Web page to process various HTML layout information and references to associated resources, may identify and process Cascading Style Sheets ("CSS") information, may process and instantiate various Javascript code associated with the Web page, may construct a native object model to represent one or more components of the Web page, and may calculate various layout and display properties of the processed content for presentation to a user.

From the perspective of a user utilizing a client computing device, a user experience can be defined in terms of the performance and latencies associated with obtaining network content over a communication network, such as obtaining a Web page, processing embedded resource identifiers, generating requests to obtain embedded resources, and rendering content on the client computing device. Latencies and performance limitations of any of the above processes may diminish the user experience. Additionally, latencies and inefficiencies may be especially apparent on computing devices with limited resources, such as processing power, memory or network connectivity such as netbooks, tablets, smartphones, and the like.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1A:
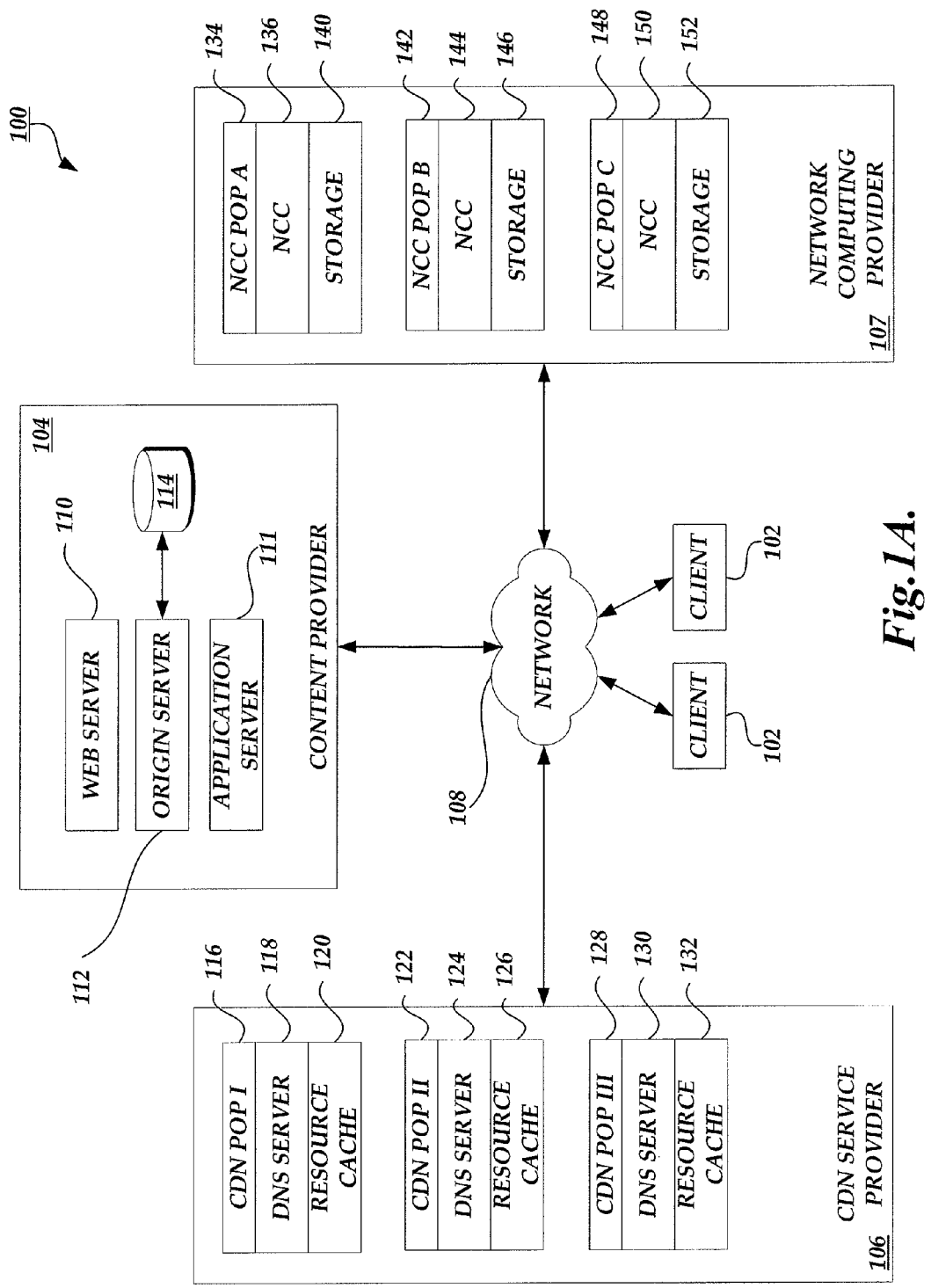
FIG. 1A is a block diagram illustrative of a content delivery environment including a number of client computing devices, content provider, a content delivery network service provider, and a network computing provider.

Generally described, the present disclosure is directed to the generation and management of a remote application session between client computing devices and content providers in conjunction with a network computing provider. Specifically, aspects of the disclosure will be described with regard to a secure request from a client computing device for network content, the establishment of a secure connection with a virtual network computing provider within the network computing provider, the decryption and processing of the request by the virtual network computing provider on behalf of the client computing device while maintaining the security of the unencrypted request data, and the continued secure communication between the client computing device and the virtual network computing provider. Although aspects of the embodiments described in the disclosure will focus, for the purpose of illustration, on the management of a virtual network computing provider, one skilled in the art will appreciate that the techniques disclosed herein may be applied to any number of hardware or software processes or applications. Further, although various aspects of the disclosure will be described with regard to illustrative examples and embodiments, one skilled in the art will appreciate that the disclosed embodiments and examples should not be construed as limiting.

With reference to an illustrative example, a user may cause a client computing device to load a software browser application (henceforth referred to as a "browser") for accessing content provided by one or more content providers. Illustratively, the accessed content may include a collection of one or more network resources (e.g., a Web page) and embedded resources such as images, video, audio, text, executable code, and other resources. In one embodiment, the browser may have a content display area or pane for displaying the accessed network content in addition to one or more local interface components, such as toolbars, menus, buttons, or other user interface controls. Local interface components may be managed and controlled by the software browser application or any other process executing or implemented locally at the client computing device. Illustratively, managing user interface controls locally may allow for a responsive user interface, as interactions by the user are processed locally on the client computing device.

Subsequent to the browser being loaded, a user or automated browser process may cause the client computing device to transmit a request to access content from a content provider. For example, the user may select or enter a URL, (e.g., https://www.xyzwebsite.com) into a browser window, causing the client computing device to transmit a request for the web site to a virtual network computing provider managed by the company which owns the client computing device. By using a virtual network computing provider that is under the control of the operator of the client computing device, the HTTPS communications can be decrypted at a point between the client computing device and the content provider endpoints because the virtual network computing provider can be configured to participate in a secure handshake procedure with each endpoint, during which encryption and decryption keys are determined. When the party which controls the virtual network computing provider limits or prevents third party access, the request data can exist at the virtual network computing provider in unencrypted form without being exposed to third parties. Such a configuration can provide the ability to implement browsing configurations with shared or parallel processing at the virtual network computing provider. Although each virtual network computing provider may be physically located within the same network computing provider, the individual virtual network computing providers can be configured as logically separate entities, and the other components of the network computing provider and other virtual network computing providers can be prevented from accessing the decrypted data contained therein.

In an illustrative embodiment, responsive to the HTTPS request received from the client computing device, the virtual network computing provider may instantiate or cause to have instantiated one or more computing components associated with the virtual network computing provider that will host a browser software application. For example, the virtual network computing provider can instantiate, or cause to have instantiated, an instance of a virtual machine that includes a software browser application capable of requesting resources from a communication network. Illustratively, in some situations, one or more devices associated with the network computing provider may be located in a data center or other robustly networked computing environment, and, as compared to the client computing device, may experience relatively little latency or delay when obtaining network resources. The software browser application or another component of the virtual network computing provider can decrypt the HTTPS request using a decryption key determined during the handshake procedure with the client computing device.

Using the instantiated network computing components, the virtual network computing provider may request the identified network resource(s) from one or more content providers, a content delivery network, or a local or associated cache component. For example, the browser software application on the instantiated network computing component can process a primary network resource and then generate additional content requests for content identified in one or more embedded resource identifiers (e.g. pictures, video files, etc.). The requests generated by the virtual network computing provider can be encrypted utilizing encryption keys determined during handshake procedures the content sources. Illustratively, in the case of other, non-browser, applications, network resources, or content may include any file type or format known in the art and supported by the specific software application.

Having obtained the requested content (e.g., the requested network resource and embedded resources), the virtual network computing provider may decrypt the content using a decryption key determined during the handshake procedure with the content source, and identify a browsing configuration specifying one or more processing actions to be performed on the requested content at the virtual network computing provider rather than, or in addition to, at the client computing device For purposes of illustration, the processing of network content by a browser may involve various processing actions before content can be rendered in an appropriate form on a client computing device. A Web page, for example, may be parsed and processed to process various HTML layout information and references to associated resources or embedded content such as CSS style sheets and Javascript, as well as embedded content objects such as images, video, audio, etc. Each object or piece of code may be parsed and processed before a representative object model corresponding to the web page may be constructed and processed further for layout and display. The virtual network computing provider can encrypt an initial processing result, containing the requested content upon which selected processing actions have been performed at virtual network computing provider, utilizing an encryption key determined during the handshake procedure with the client computing device. The virtual network computing provider can provide the encrypted initial processing result to the client computing device for further processing and display according to the selected browsing configuration. The client computing device can decrypt the initial processing result utilizing a decryption key determined during the handshake procedure with the virtual network computing provider.

FIG. 1A is a block diagram illustrative of a networked computing environment 100 for the management and processing of content requests. As illustrated in FIG. 1A, the networked computing environment 100 includes a number of client computing devices 102 (generally referred to as clients) for requesting content and content processing from a content provider 104, CDN service provider 106, or network computing provider 107. In an illustrative embodiment, the client computing devices 102 can corresponds to a wide variety of computing devices including personal computing devices, laptop computing devices, hand-held computing devices, terminal computing devices, mobile devices (e.g., mobile phones, tablet computing devices, etc.), wireless devices, various electronic devices and appliances and the like. In an illustrative embodiment, the client computing devices 102 include necessary hardware and software components for establishing communications over a communication network 108, such as a wide area network or local area network. For example, the client computing devices 102 may be equipped with networking equipment and browser software applications that facilitate communications via the Internet or an intranet. The client computing devices 102 may have varied local computing resources such as central processing units and architectures, memory, mass storage, graphics processing units, communication network availability and bandwidth, etc.

The networked computing environment 100 can also include a content provider 104 in communication with the one or more client computing devices 102 or other service providers (e.g., CDN service provider 106, network computing provider 107, etc.) via the communication network 108. The content provider 104 illustrated in FIG. 1A corresponds to a logical association of one or more computing devices associated with a content provider. Specifically, the content provider 104 can include a web server component 110 corresponding to one or more server computing devices for obtaining and processing requests for content (such as Web pages) from the client computing devices 102 or other service providers. The content provider 104 can further include an origin server component 112 and associated storage component 114 corresponding to one or more computing devices for obtaining and processing requests for network resources from the CDN service provider. The content provider 104 can still further include an application server computing device 111, such as a data streaming server, for processing streaming content requests. One skilled in the relevant art will appreciate that the content provider 104 can be associated with various additional computing resources, such as additional computing devices for administration of content and resources, DNS name servers, and the like. For example, although not illustrated in FIG. 1A, the content provider 104 can be associated with one or more DNS name server components that would be authoritative to resolve client computing device DNS queries corresponding to a domain of the content provider.

With continued reference to FIG. 1A, the networked computing environment 100 can further include a CDN service provider 106 in communication with the one or more client computing devices 102 and other service providers via the communication network 108. The CDN service provider 106 illustrated in FIG. 1A corresponds to a logical association of one or more computing devices associated with a CDN service provider. Specifically, the CDN service provider 106 can include a number of Point of Presence ("POP") locations 116, 122, 128 that correspond to nodes on the communication network 108. Each CDN POP 116, 122, 128 includes a DNS component 118, 124, 130 made up of a number of DNS server computing devices for resolving DNS queries from the client computers 102. Each CDN POP 116, 122, 128 also includes a resource cache component 120, 126, 132 made up of a number of cache server computing devices for storing resources from content providers and transmitting various requested resources to various client computers. The DNS components 118, 124, and 130 and the resource cache components 120, 126, 132 may further include additional software and/or hardware components that facilitate communications including, but not limited to, load balancing or load sharing software/hardware components.

In an illustrative embodiment, the DNS component 118, 124, 130 and resource cache component 120, 126, 132 are considered to be logically grouped, regardless of whether the components, or portions of the components, are physically separate. Additionally, although the CDN POPs 116, 122, 128 are illustrated in FIG. 1A as logically associated with the CDN service provider 106, the CDN POPs will be geographically distributed throughout the communication network 108 in a manner to best serve various demographics of client computing devices 102. Additionally, one skilled in the relevant art will appreciate that the CDN service provider 106 can be associated with various additional computing resources, such as additional computing devices for administration of content and resources, and the like.

With further continued reference to FIG. 1A, the networked computing environment 100 can also include a network computing provider 107 in communication with the one or more client computing devices 102, the CDN service provider 106, and the content provider 104 via the communication network 108. The network computing provider 107 illustrated in FIG. 1A also corresponds to a logical association of one or more computing devices associated with a network computing provider. Specifically, the network computing provider 107 can include a number of Point of Presence ("POP") locations 134, 142, 148 that correspond to nodes on the communication network 108. Each POP 134, 142, 148 includes a network computing component (NCC) 136, 144, 150 for hosting applications, such as data streaming applications, via a number of instances of a virtual machine, generally referred to as an instance of an NCC. One skilled in the relevant art will appreciate that NCC 136, 144, 150 would include physical computing device resources and software to provide the multiple instances of a virtual machine or to dynamically cause the creation of instances of a virtual machine. Such creation can be based on a specific request, such as from a client computing device, or the NCC can initiate dynamic creation of an instance of a virtual machine on its own. Each NCC POP 134, 142, 148 also includes a storage component 140, 146, 152 made up of a number of storage devices for storing any type of data used in the delivery and processing of network or computing resources, including but not limited to user data, state information, processing requirements, historical usage data, and resources from content providers that will be processed by an instance of an NCC 136, 144, 150 and transmitted to various client computers, etc. The NCCs 136, 144, 150 and the storage components 140, 146, 152 may further include additional software and/or hardware components that facilitate communications including, but not limited to, load balancing or load sharing software/hardware components for selecting instances of a virtual machine supporting a requested application and/or providing information to a DNS nameserver to facilitate request routing.

In an illustrative embodiment, NCCs 136, 144, 150 and the storage components 140, 146, 152 are considered to be logically grouped, regardless of whether the components, or portions of the components, are physically separate. For example, a network computing provider 107 may maintain separate POPs for providing the NCC and the storage components. Additionally, although the NCC POPs 134, 142, 148 are illustrated in FIG. 1A as logically associated with a network computing provider 107, the NCC POPs will be geographically distributed throughout the communication network 108 in a manner to best serve various demographics of client computing devices 102. Additionally, one skilled in the relevant art will appreciate that the network computing provider 107 can be associated with various additional computing resources, such additional computing devices for administration of content and resources, and the like. Even further, one skilled in the relevant art will appreciate that the components of the network computing provider 107 and components of the CDN service provider 106 can be managed by the same or different entities.

Figure 1B:
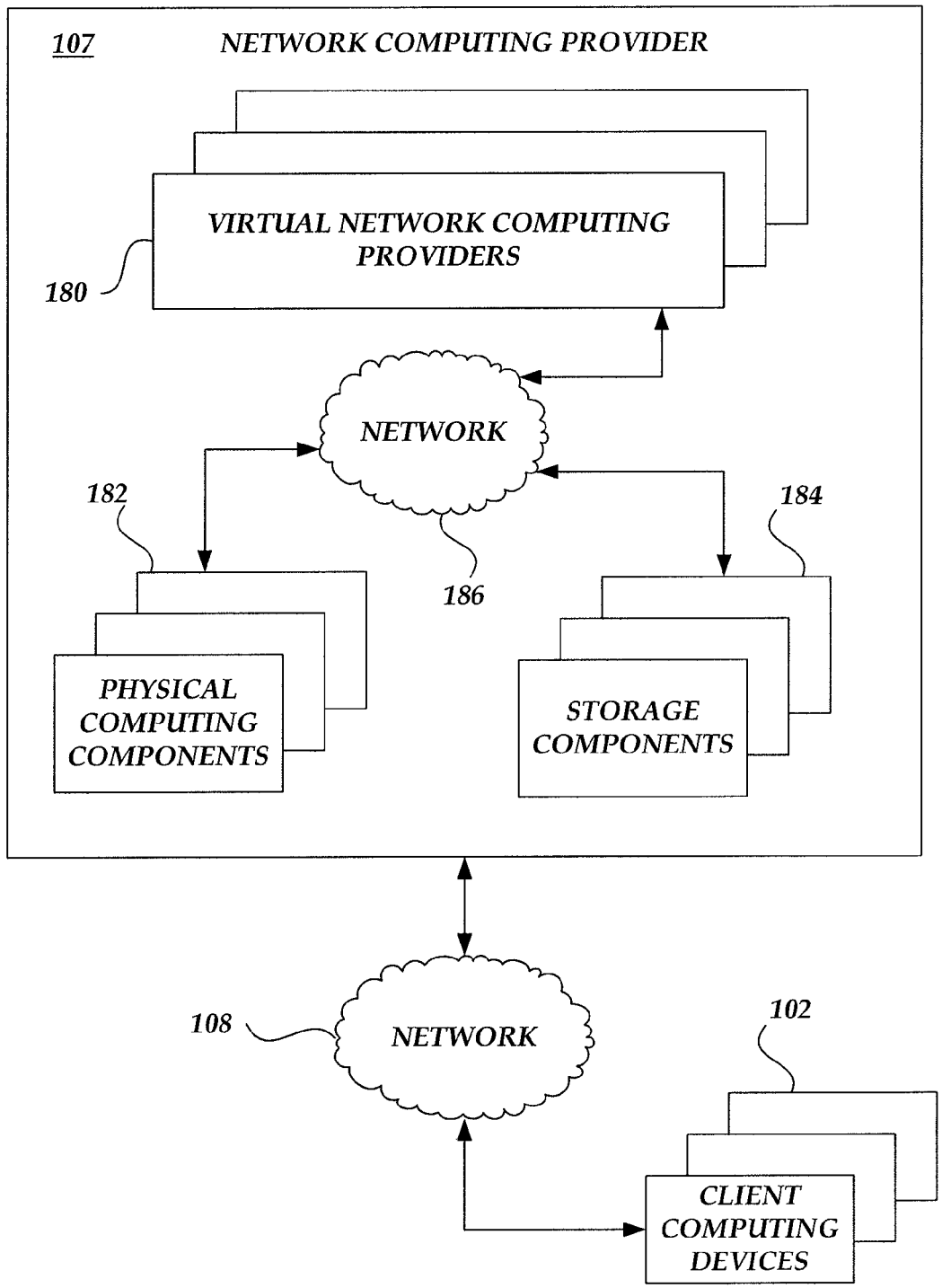
FIG. 1B is a block diagram of a network computing provider configured to manage virtual network computing providers that are logically separate from one another and from the rest of the network computing provider.

FIG. 1B is a block diagram schematically illustrating an example of a network computing provider 107, described above with respect to FIG. 1A, that can provide computing resources to multiple client computing devices 102 via a communication network 108. For example, and as described in detail herein, the network computing provider 107 can manage requests from a client computing device 102 to retrieve a network resource, such as web site, for a content source, such as a content provider 104 or CDN service provider 106 as illustrated in FIG. 1A. The network computing provider 107 can be configured to process requests from client computing devices 102, retrieve responsive resources from content sources, and determine browsing configurations. Under some browsing configurations, the network computing provider 107 can process some or all of the requested network resource, either exclusively or in parallel with the client computing device 102. The result of such browsing configurations can be an improvement in performance speed, reliability, privacy, etc., when compared to the client computing device 102 processing the network resources exclusively.

In some cases, a request can be sent from the client computing device 102 using a secure protocol, such as Hyper Text Transfer Protocol Secure (HTTPS). One problem, among others, posed by using a secure protocol such as HTTPS is that when the client computing device 102 transmits an HTTPS request, or when a content source transmits an HTTPS response, the network computing provider 107 may not have access to the decryption key needed to decrypt the HTTPS communication and access the communication data. Without a decryption key, the network computing provider 107 may not be able to analyze the requests from the client computing device 102 or the responses from the content source in order to determine and implement a browsing configuration with shared or parallel processing at the network computing provider 107. Therefore, the network computing provider 107 may have to pass the encrypted HTTPS request to the content source and pass the HTTPS response from the content source back to client computing device 102 without any decryption in between, and therefore without any shared or parallel processing of the resource. Alternatively, the client computing device 102 may exchange all HTTPS communications directly with the content source, bypassing the network computing provider 107 altogether and therefore not realizing the advantaged of shared or parallel processing at the network computing provider 107. One way to achieve shared or parallel processing, at the network computing provider 107, of content communicated through HTTPS transmissions is for the network computing provider 107 to break the encryption. In such a configuration, the transmitted data may exist in unencrypted form at the network computing provider 107 for some period of time. This result may be undesirable because in some cases there are third parties with access to the network computing provider 107, and those third parties may be able to access the unencrypted data.

By using a network computing provider 107 that is under the control of the operator of the content source or the user of the client computing device 102, the HTTPS communications can be decrypted between those endpoints because the network computing provider 107 can be configured to participate in the secure handshake procedure, describe herein, during which encryption and decryption keys are determined. When the party which controls the network computing provider 107—either the user of the client computing device 102 or the operator of the content source—limits or prevents third party access, the data can exist at the network computing provider in unencrypted form without being exposed to third parties. Such a configuration can provide the ability to implement browsing configurations with shared or parallel processing at the network computing provider 107. Owning and/or operating an entire network computing provider 107 may not be feasible in some cases. In such cases, an existing network computing provider 107 can provide virtual network computing providers 180 which operate on the physical computing components 182 and storage components 184 of the network computing provider 107. Although each virtual network computing provider 180 is physically located within the network computing provider 107, it can be configured as a logically separate entity, and the other components of the network computing provider 107 and other virtual network computing providers 180 can be prevented from accessing its data.

In some embodiments, communications from a client computing device 102 to the virtual network computing provider 180 can be secure, but there may not be a need for communications between the virtual network computing provider 180 and the content source to be secure. For example, a user of a client computing device 102 may wish to ensure that communications between the client computing device 102 and the virtual network computing provider 180 are secure, such as when there is a different level of trust associated with that network connection than with the network connection between the virtual network computing provider 180 and the content source. There may be a greater level of trust associated with the network connection between the virtual network computing provider 180 and the content source, or the client computing device 102 may wish to communicate, through a virtual network computing provider 180, with a content source that does not accept secure communications. In such cases, the communications that the virtual network computing provider 180 exchanges with the content source on behalf of the client computing device 102 may not be secure.

Referring now to FIG. 1B, HTTPS requests from client computing devices 102 can originate from a browsing application, and can be transmitted via a network 108 to a virtual network computing provider 180 of the network computing provider 107. The client computing devices 102 can be remote from the network computing provider 107. In some embodiments, the client computing devices 102 may include any of a number of computing devices that are capable of communicating over a network 108 including, but not limited to, a laptop, personal computer, personal digital assistant (PDA), hybrid PDA/mobile phone, mobile phone, electronic book reader, digital media player, tablet, etc.

The network 108 may, for example, be a publicly accessible network of linked networks, possibly operated by various distinct parties, such as the Internet. In other embodiments, the network 108 may be a private network, such as, for example, a corporate or university network that is wholly or partially inaccessible to non-privileged users. In still other embodiments, the network 108 may include a private network, personal area network, local area network, wide area network, cable network, satellite network, cellular telephone network, etc. or combination thereof, each with access to and/or from the Internet.

The network computing provider 107 provides a variety of components for managing the network computing needs of multiple client computing devices 102. In the example illustrated in FIG. 1B, the network computing provider 107 comprises a plurality of physical computing components 182 to execute programs of the network computing provider 107. The illustration of the network computing provider 107 is an alternative view of the network computing provider illustrated in FIG. 1A, and can be a different logical association of the same components illustrated in the network computing provider 107 of FIG. 1A. For example, the physical computing components 182 in FIG. 1B can be equivalent to the NCCs 136, 144, 150 in FIG. 1A. The storage components 184 in FIG. 1B can be equivalent to the storage 140, 146, 152 in FIG. 1A.

The various components of the network computing provider 107 in FIG. 1B can be configured to communicate with each other over a network 186. The network 186 can be the same network as network 108, an equivalent network, etc. Each virtual network computing provider 180 can execute on any number or combination of physical computing components 182 and storage components 184.

The physical computing components 182 may comprise one or more physical computing systems, such as servers, each having a central processing unit (CPU), input/output (I/O) components, storage, and memory. In some embodiments, the physical computing components 182 may include midrange computers, mainframe computers, and the like. One or more virtual machines may be hosted on the physical computing components 182. For example, the network computing provider 107 may provide multiple virtual machines and include a virtual machine ("VM") manager to manage those virtual machines (e.g., a hypervisor or other virtual machine monitor). In some embodiments, individual or groups of physical computing components 182 may be located in different geographical locations, for example the POPs 134, 142, 148 illustrated in FIG. 1A and described above.

In the example illustrated in FIG. 1B, each of the physical computing components 182 has some amount of computing resources available for executing one or more programs. In some embodiments, the network computing provider 107 may provide a selection of various different physical computing components 182, or VM images to launch on the physical computing components 182, from which a customer may choose for creating a virtual network computing provider 180. In some embodiments, the network computing provider 107 may provide one or more virtual network computing provider 180 configurations to choose from. For example, a network computing provider 107 can provide a virtual computing provider 180 for lease, purchase, etc. that is preconfigured with a collection of browsing applications and other components, described in detail below, for decrypting and encrypting secure communications between client computing devices 102 and content sources, and for determining browsing configurations which implement shared or parallel processing of resources at the virtual network computing provider 180.

With reference now to FIGS. 2-6, the interaction between various components of the networked computing environment 100 of FIG. 1A will be illustrated. Specifically, FIGS. 2A, 3A, 4A, 5A, and 6A (FIGS. 2A-6A) illustrate the interaction between various components of the networked computing environment 100 for the exchange of content between a client computing device 102 and a content provider 104 via the network computing provider 107. FIGS. 2B, 3B, 4B, 5B, and 6B (FIGS. 2B-6B) illustrate the additional exchanges which can occur when a client computing device 102 utilizes a secure protocol, such as HTTPS, to request a network resource from a network computing provider 107 or a virtual network computing provider 180. The interactions illustrated in FIGS. 2B-6B typically execute before the corresponding interactions in FIGS. 2A-6A, although other ordering is possible. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

Figure 2A:
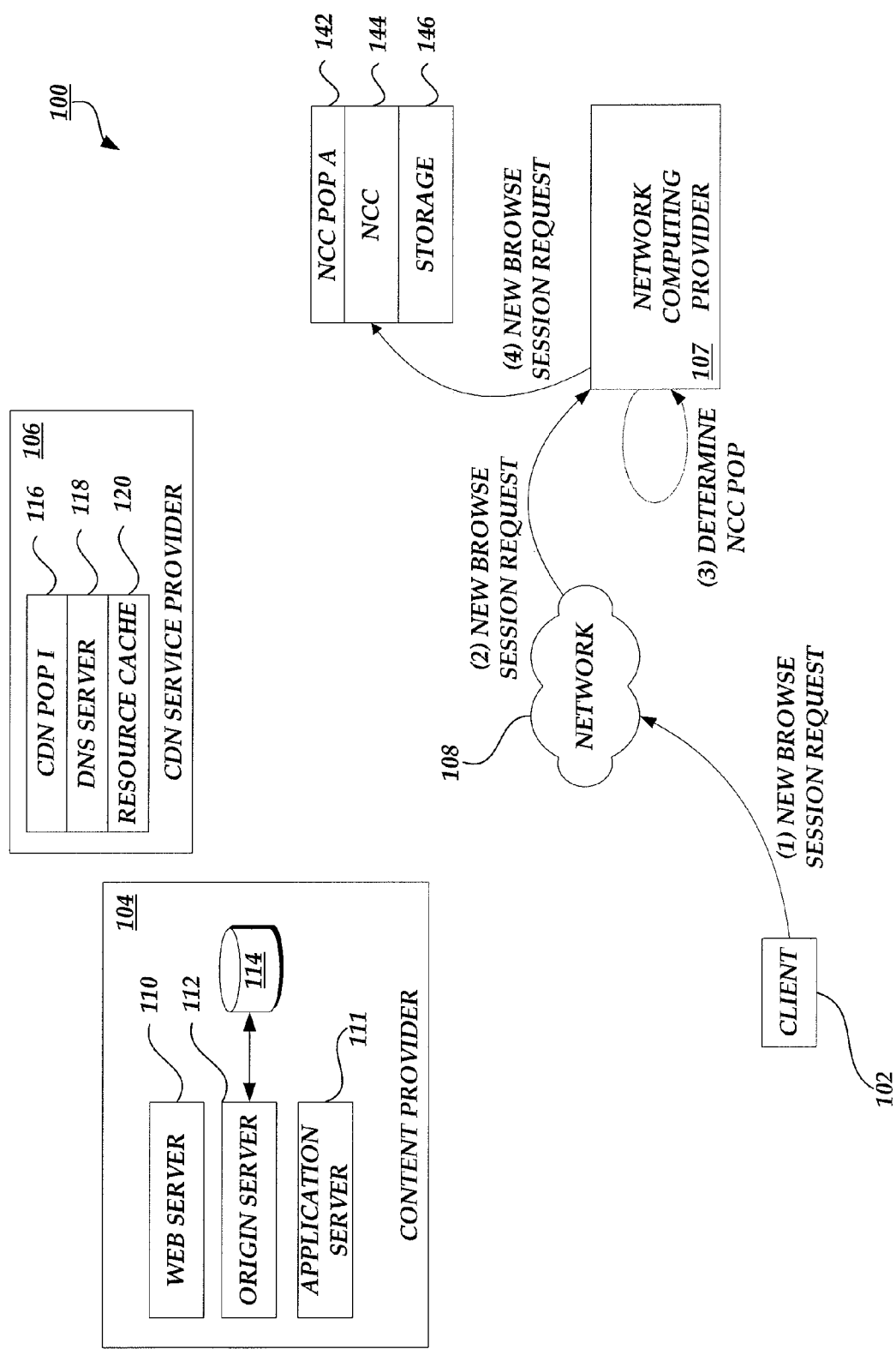
FIG. 2A is a block diagram of the content delivery environment of FIG. 1A illustrating the generation and processing of a new browse session request from a client computing device to a network computing provider.

With reference to FIG. 2A, the process can begin with the generation and processing of a browse session request from a client computing device 102 to a network computing provider 107 will be described. Illustratively, the client computing device 102 may load a browser for viewing network content in response to an event or user request. Subsequent to the browser being loaded, the browser may be implemented to request a new browse session. From the perspective of the user of the client computing device, the request for the new browse session corresponds to the intended request to transmit the request to one or more corresponding content providers 104. Illustratively, this request may be generated automatically as a result of the browser loading (e.g., a request for a default or "home" page), or may be generated as a result of a user following a link or entering a network address into an address bar. As illustrated in FIG. 2A, the browse session request is transmitted first to a network computing provider 107. In an illustrative embodiment, the network computing provider 107 utilizes a registration application program interface ("API") to accept browse session requests from the client computing device 102. The browse session request can include network address information corresponding to a requested network resource, which may be in any form, including, but not limited to, an Internet Protocol ("IP") address, a URL, a Media Access Control ("MAC") address, etc.

Figure 2B:
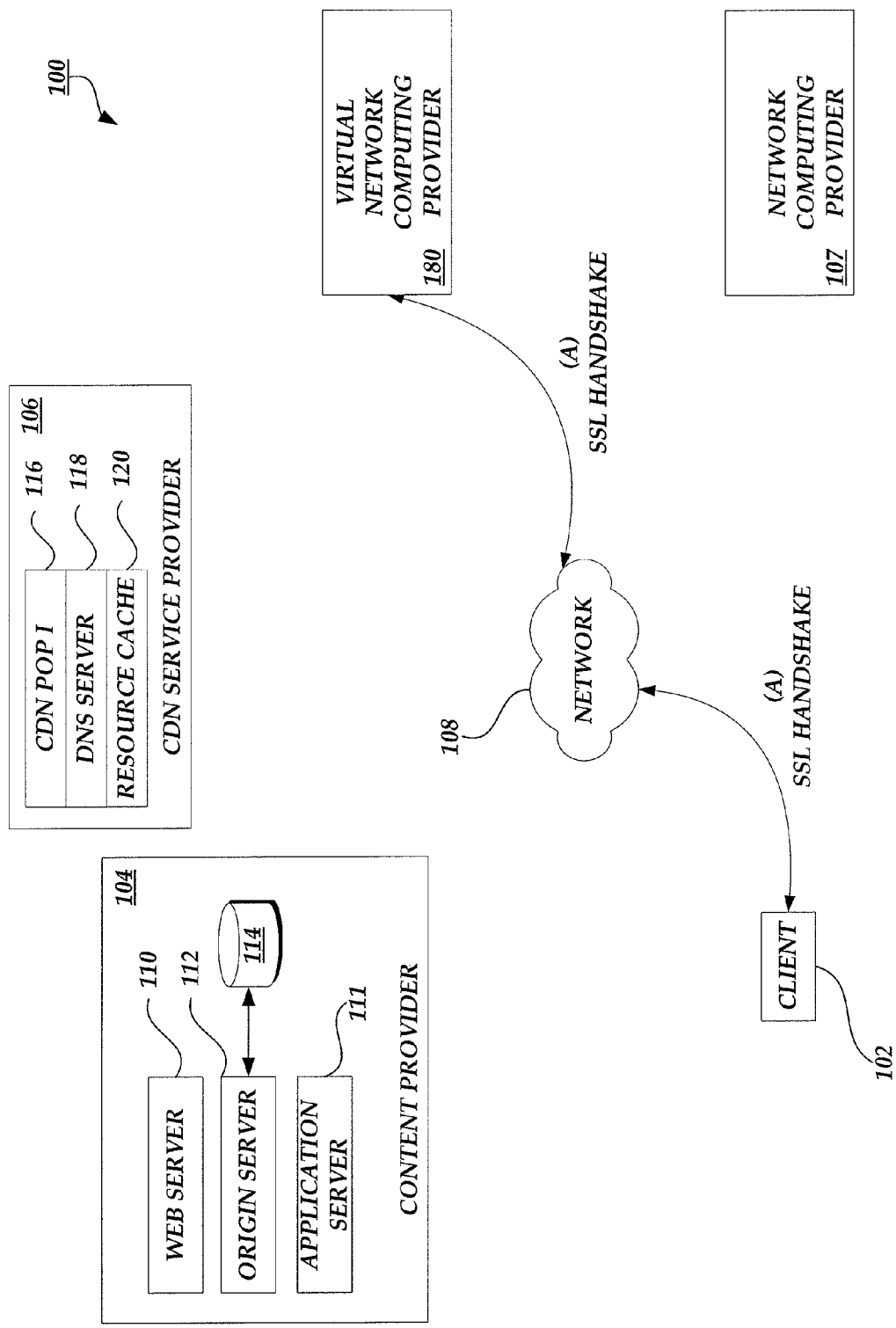
FIG. 2B is a block diagram of the content delivery environment of FIG. 1A illustrating an SSL handshake that occurs between a client computing device and a network computing provider.

Subsequent to the receipt of the browse session request, the network computing provider 107 may select an associated network computing component (hereinafter "NCC") point of presence (hereinafter "POP") such as NCC POP 142 to service the browse session request. The selection of the NCC POP may determine the processing and network resources available to the instantiated virtual machine. The selection of processing and network resources and the provisioning of software at the NCC POP instance may be done, at least in part, in order to optimize communication with content providers 104 and client computing devices 102. As illustrated in FIG. 2B, the identification data received with the browse session request can be passed to the NCC POP instance servicing the browse session request.

With reference to FIG. 2B, an SSL handshake between the client computing device 102 and the virtual network computing provider 180 will be described. Before a client computing device 102 can transmit an HTTPS request or other secure communication, an SSL handshake procedure, known in the art, is performed first. For example, if the new browse session request (1), as illustrated in FIG. 2A, is to be made over a secure HTTPS connection, an SSL handshake procedure (A), as illustrated in FIG. 2B, is performed first. As described in detail herein, a virtual network computing provider 180 can be used to process such HTTPS requests, rather than the general network computing provider 107. In some embodiments, alternative protocols are utilized to establish a secure connection between the client computing device 102 and the virtual network computing provider 180. For example, a tunneled connection such as a VPN can be established, allowing the client computing device 102 and the virtual network computing provider 180 to exchange secure communications. In another example, a VPN connection can be used in conjunction with an HTTPS connection to provide additional security.

Figure 3A:
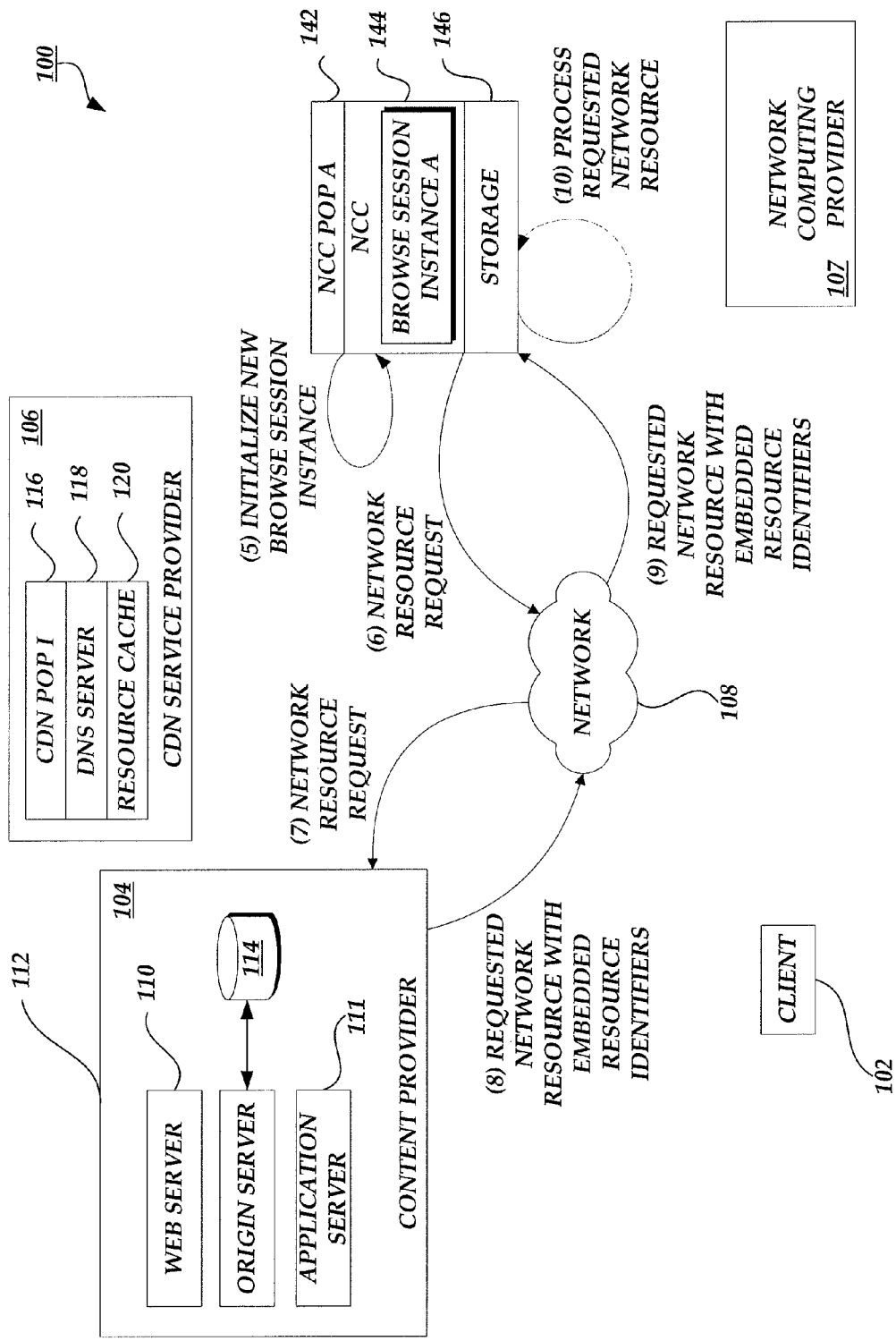
FIG. 3A is a block diagram of the content delivery environment of FIG. 1A illustrating the generation and processing of a request for a network resource from a network computing provider to a content provider.

With reference to FIG. 3A, an illustrative interaction for generation and processing of a request for a network resource from a network computing provider 107 to a content provider 104 will be described. As illustrated in FIG. 3A, the selected NCC POP 142 may generate a browse session corresponding to one or more content providers based on a browse session request, such as the illustrative browse session request depicted in FIG. 2A above. Illustratively, instantiating a new browse session instance may include loading a new virtual machine instance and/or browser instance at the NCC POP 142, reserving or allocating device memory, storage or cache space, processor time, network bandwidth, or other computational or network resources for the new browse session.

Subsequent to initializing a new browse session instance, NCC POP 142 may provide a request for a network resource to a content provider 104 based on a network address included in the browse session request. For example, a browse session request may include a URL for a Web page, such as "http://www.xyzsite.com/default.htm." NCC POP 142 may resolve the URL to an IP address through a DNS resolver associated with the network computing provider (not shown), and may request the Web page from the content provider 104 at the resolved IP address. In various embodiments, a network resource may be retrieved from any combination of content providers, content delivery network (hereinafter "CDN") servers, or caches associated with the network computing provider 107. For example, the network computing provider may check if a resource is stored in a local cache or in another server or service provider associated with the network computing provider 107. If a network resource is stored in a local or associated location, the NCC POP 142 may retrieve the network resource from the local or associated location rather than from the third party content provider 104 or CDN service provider 106. Illustratively, the NCC POP 142 may provide requests for any number of network resources as included in the browse session request, and may obtain these network resources from any number of different sources, sequentially or in parallel.

As illustrated in FIG. 3A, the content provider 104 receives the resource request from the NCC POP 142 and processes the request accordingly. In one embodiment, the content provider 104 processes the resource request as if it were originally provided by the client computing device 102. For example, the content provider 104 may select the type of content, ordering of content, or version of content according to the requirements of the requesting client computing device 102. In another embodiment, the content provider 104 may be provided with information that provides information associated with the NCC POP 142 for utilization in providing the requested content (e.g., an available amount of processing resources or network bandwidth).

Subsequent to obtaining the requested network resource from the content provider 104 (or other source designated by the content provider), the NCC POP 142 may process the network resource to extract embedded resource identifiers and gather information for determination of a remote session browsing configuration. For example, a network resource such as a Web page may include embedded CSS style information and Javascript as well as embedded resource identifiers to additional resources such as text, images, video, audio, animation, executable code, and other HTML, CSS, and Javascript files. In the process of extracting the embedded resource identifiers, the NCC POP 142 may gather information about the processed network resources for later use in the determination of a remote session browsing configuration as discussed below with reference to FIG. 4A.

Figure 3B:
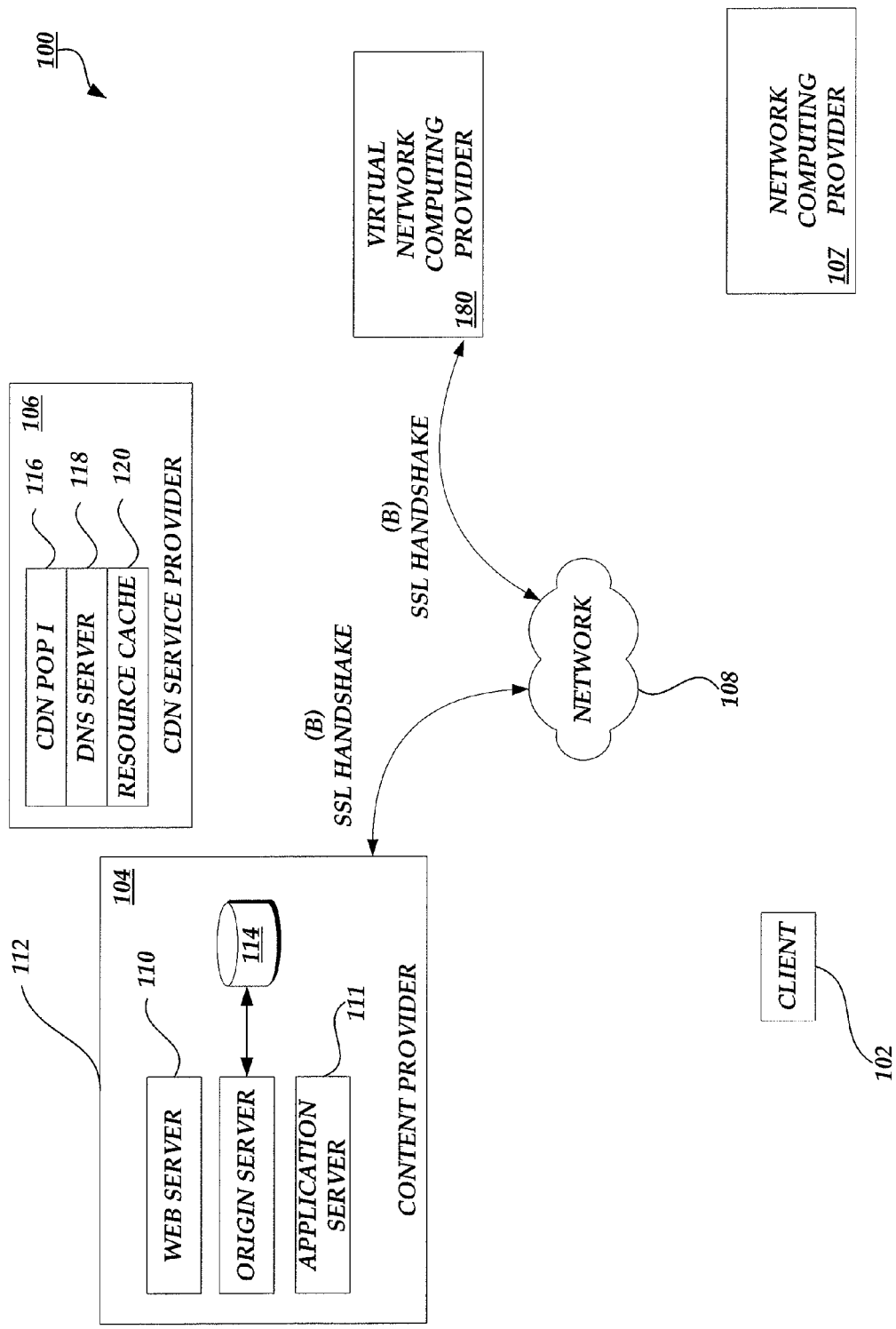
FIG. 3B is a block diagram of the content delivery environment of FIG. 1A illustrating an SSL handshake that occurs between a network computing provider and a content provider.

With reference to FIG. 3B, the SSL handshake procedure between the virtual network computing provider 180 and the content provider 104 will be described. Before a virtual network computing provider 180 can transmit an HTTPS request or other secure communication to a content provider 104, an SSL handshake procedure, known in the art, is performed first. For example, if the network resource request (6), as illustrated in FIG. 3A, is to be made over a secure HTTPS connection, an SSL handshake procedure (B), as illustrated in FIG. 3B, is performed first. As described in detail herein, a virtual network computing provider 180 can be used to transmit such HTTPS requests, rather than the general network computing provider 107. In some embodiments, alternative methods or protocols can be used to establish a secure connection between the virtual network computing provider 180 and the content provider 104. For example, when the virtual network computing provider 180 is managed by the content provider 104, a VPN connection can be used instead of, or in addition to, an HTTPS connection.

Figure 4A:
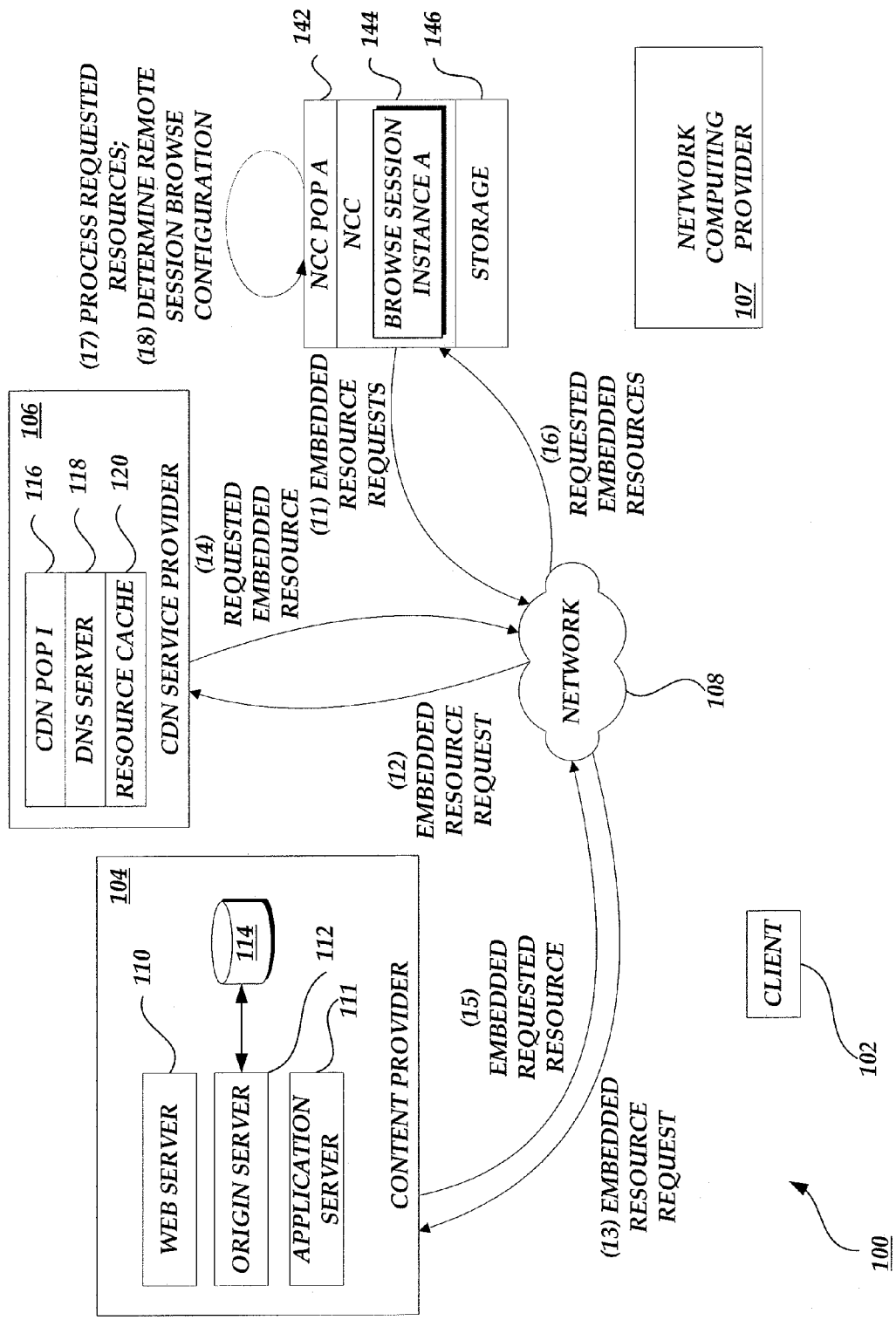
FIG. 4A is a block diagram of the content delivery environment of FIG. 1A illustrating the generation and processing of one or more requests corresponding to one or more embedded resources from a network computing provider to a content provider and content delivery network.

With reference to FIG. 4A, an illustrative interaction for generation and processing of one or more requests corresponding to one or more embedded resources from a network computing provider to a content provider and content delivery network is disclosed. As illustrated in FIG. 4A, the selected NCC POP 142 may provide resource requests to one or more sources of content such as content provider 104 and CDN POP 116. The resource requests may correspond to embedded resources based on one or more embedded resource identifiers extracted from a requested network resource (e.g., a Web page) as described in FIG. 3A above. In various embodiments, embedded resources may be retrieved from any combination of content providers, CDN servers, or caches associated with the network computing provider 107. For example, the network computing provider may check if an embedded resource is stored in a local cache or in another server or service provider associated with the network computing provider 107. If an embedded resource is stored in a local or associated location, the NCC POP 142 may retrieve the embedded resource from the local or associated location rather than the third party content provider or CDN. Illustratively, the NCC POP 142 may provide requests for any number of embedded resources referenced by a network resource, and may obtain these embedded resources from any number of different sources, sequentially or in parallel. Subsequent to obtaining the requested resources, the NCC POP 142 may process the resources and requested content to determine a remote session browsing configuration for the processing and communication of content to the client computing device 102.

Figure 4B:
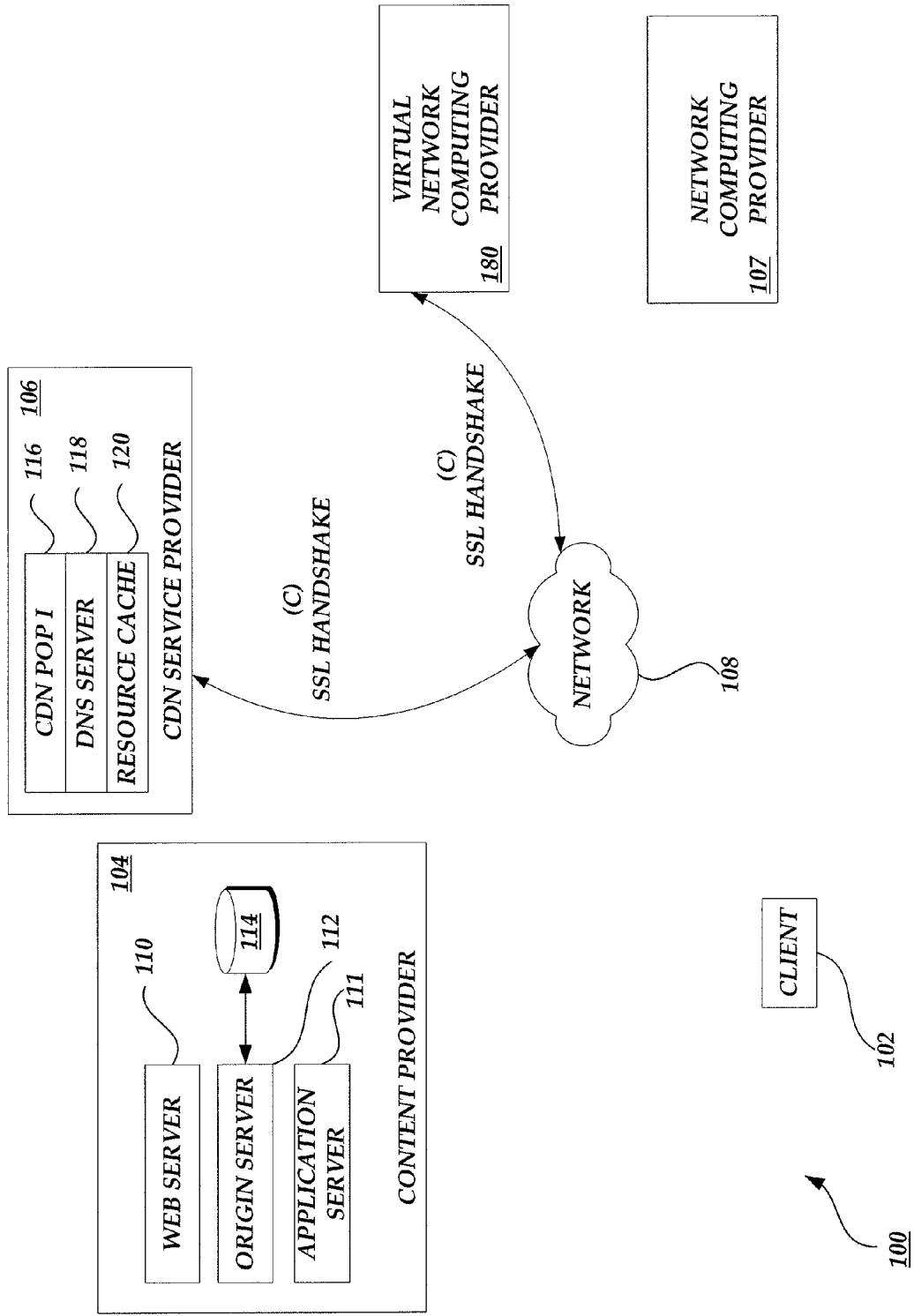
FIG. 4B is a block diagram of the content delivery environment of FIG. 1A illustrating an SSL handshake that occurs between a network computing provider and a source of embedded network resources.

With reference to FIG. 4B, the SSL handshake procedure between the virtual network computing provider 180 and the CDN service provider 106 will be described. Before a virtual network computing provider 180 can transmit an HTTPS request or other secure communication to a CDN service provider 106, an SSL handshake procedure, known in the art, is performed first. For example, if the embedded resource request (14), as illustrated in FIG. 4A, is to be made over a secure HTTPS connection, an SSL handshake procedure (C), as illustrated in FIG. 4B, is performed first. As described in detail herein, a virtual network computing provider 180 can be used to transmit such HTTPS requests, rather than the general network computing provider 107. As described above with respect to FIGS. 2B and 3B, alternative methods and protocols, such as tunneled VPN connections, can be used to establish a secure connection between the virtual network computing provider 180 and the CDN service provider 106.

Figure 5A:
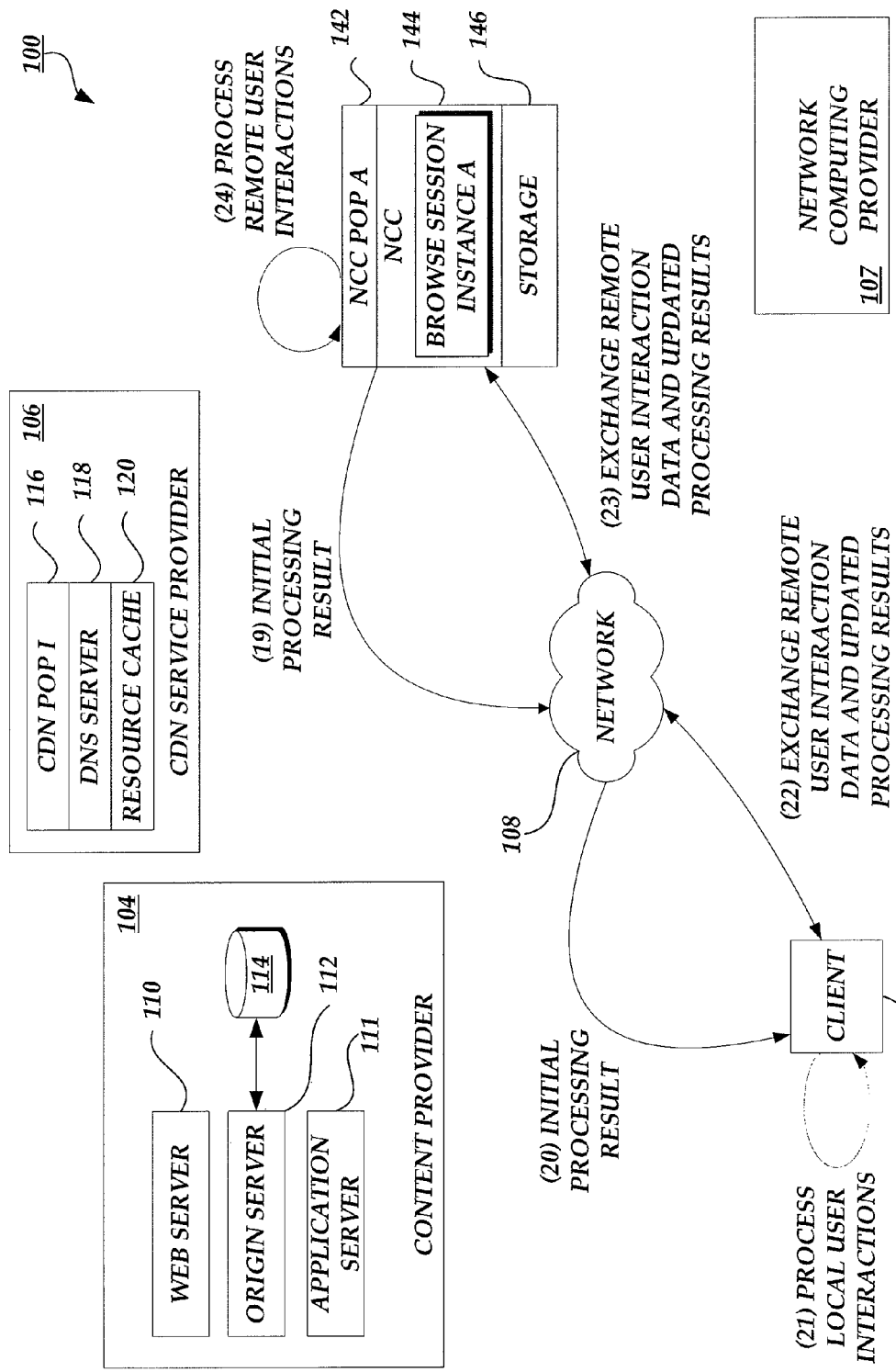
FIG. 5A is a block diagram of the content delivery environment of FIG. 1A illustrating the generation and processing of browse session data and user interaction data between a network computing provider and client computing device.
Figure 5B:
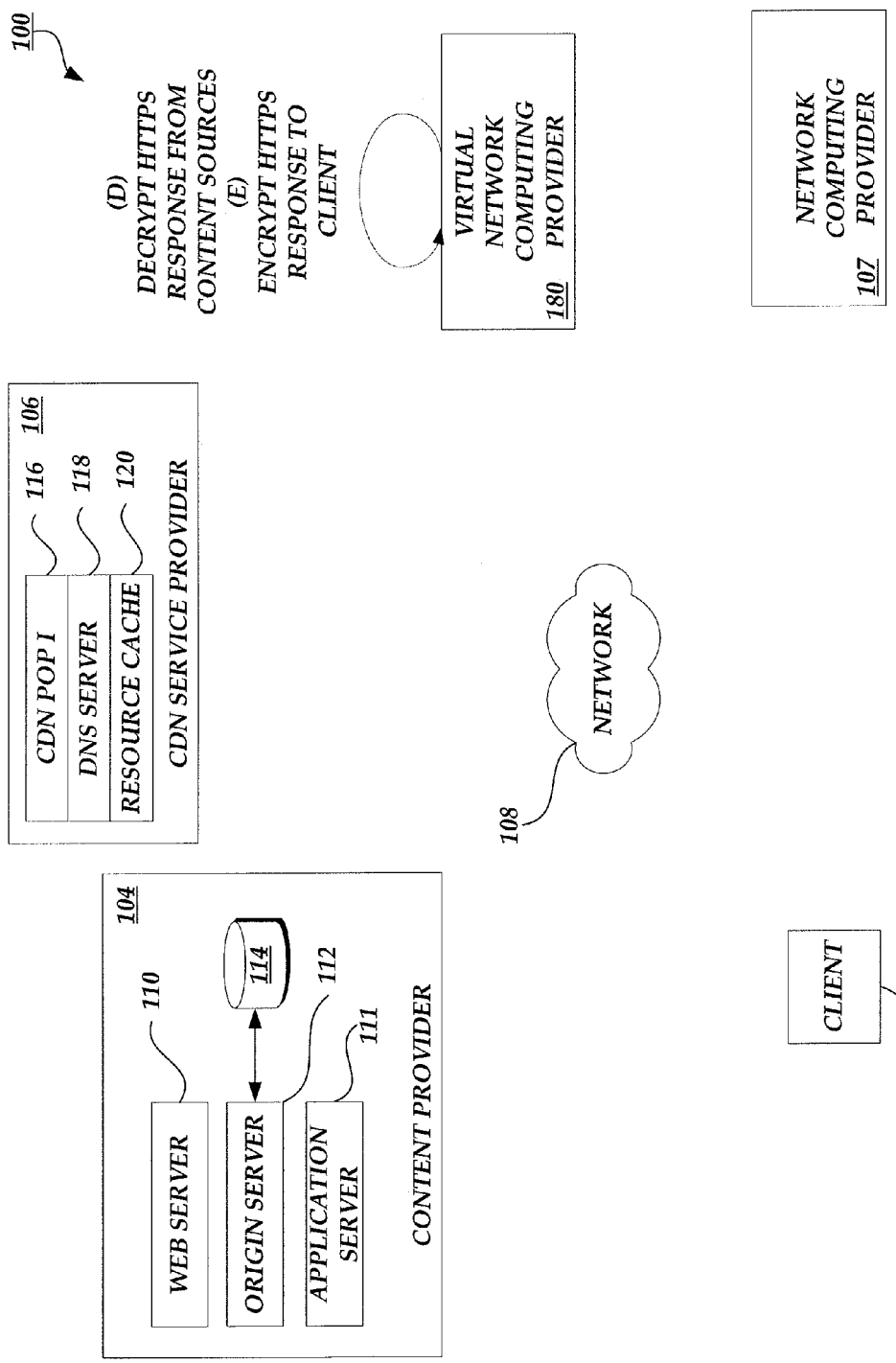
FIG. 5B is a block diagram of the content delivery environment of FIG. 1A illustrating the decryption and processing of a response from a content source, and the encryption of a response to a client computing device.

With reference to FIG. 5A, an illustrative interaction for generation and processing of processing results and user interaction data between a network computing provider and client computing device is disclosed. As previously described, in one embodiment, the respective browsers on the instantiated network computing component and the client computing device 102 can exchange browsers' session information related to the allocation and processing of the requested resources at the instantiated network computing component and client computing device. As illustrated in FIG. 5A, the selected NCC POP 142 may provide an initial processing result to the client computing device 102 over the network 108. The initial processing result may correspond to requested network content, such as a Web page, along with associated embedded resources processed by the NCC POP 142 in accordance with a selected remote session browsing configuration as described in FIG. 4A above. As illustrated in FIG. 5B, the initial processing result can be substantially free of identification information transmitted from the content provider 104, such as cookies and the like.

The NCC POP 142 also makes a determination of which additional processes will be conducted at the NCC POP 142, at the client computing device 102, or both, as illustrated in FIG. 5A. Subsequent to receiving an initial processing result and the allocation of processes, the client computing device 102 may perform any remaining processing actions on the initial processing result as required by the selected remote session browsing configuration, and may display the fully processed content in a content display area of a browser. The client computing device 102 may process any local user interactions with local interface components or content elements locally, and may provide user interactions requiring remote processing to the network computing provider 107. The network computing provider 107 may provide updated processing results to the client computing device 102 in response to changes to the content or remote user interaction data from the client computing device 102.

When the response from the content provider is an HTTPS response or another type of secured response, a virtual network computing provider 180 can be used to process the response without exposing it to third parties. For example, as illustrated in FIG. 5B, the virtual network computing provider 180 can decrypt the HTTPS response or responses received from the content sources prior to processing the resources as described herein. The virtual network computing provider 180 can utilize the decryption keys determined during the SSL handshake procedures illustrated in FIGS. 3B and 4B. When the resources are to be transmitted to the client computing device 102, the virtual network computing provider can encrypt resources and create an HTTPS response. The virtual network computing provider 180 can utilize the encryption key determined during the SSL handshake procedure illustrated in FIG. 2A.

Figure 6A:
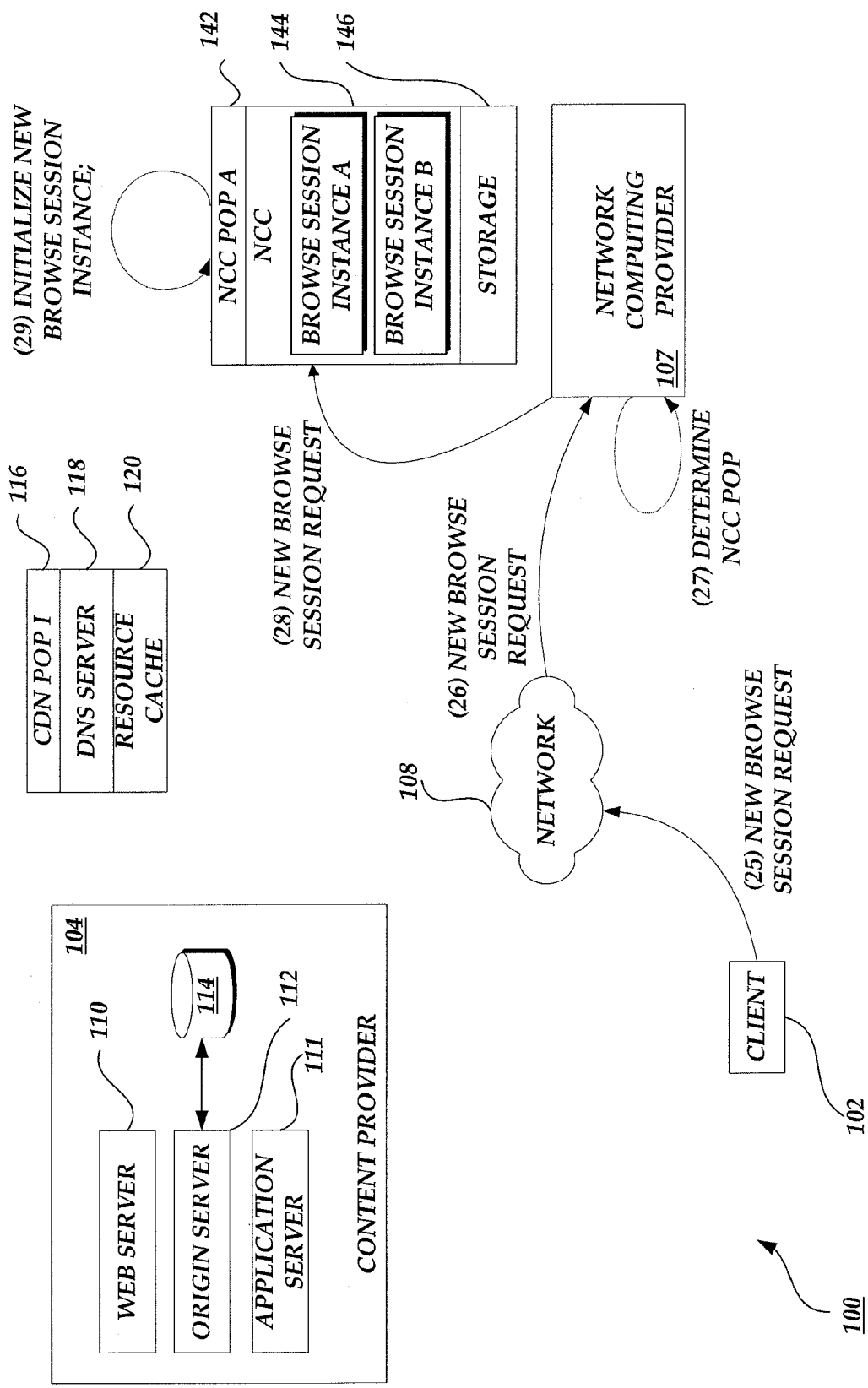
FIG. 6A is a block diagram of the content delivery environment of FIG. 1A illustrating the generation and processing of an additional new browse session request from a client computing device to a network computing provider.

With reference to FIG. 6A, a block diagram of the content delivery environment of FIG. 1A illustrating the generation and processing of an additional new browse session request from a client computing device to a network computing provider is disclosed. As illustrated in FIG. 6A, a second new browse session request may be sent to network computing provider 107 from client computing device 102 across network 108. In an illustrative embodiment, the network computing provider 107 utilizes a registration API to accept browse session requests from the client computing device 102.

The additional browse session request may be generated by a client computing device 102 in response to a user opening up a new browser window with a new content display area, opening a new content display area in an existing browser window (e.g., opening a new tab in a browser), requesting new network content in an existing content display area (e.g., following a link to a new network resource, or entering a new network address into the browser), or any other user interaction. For example, a user browsing a first Web page corresponding to a first browse session instance may follow a link that opens a new tab or browser window to view a second Web page. In one embodiment, any required steps of obtaining and processing content associated with the second Web page may be performed by the currently instantiated network computing component in which the browser can handle the processing of both resource requests. In another embodiment, the client computing device 102 request may be processed as a new browse session request to the network computing provider 107, including the network address of the second Web page. In this embodiment, the browser on the client computing device may not specifically request a separate browse session, and a user's interaction with the browser on the client computing device 102 may appear to be part of a same browsing session. As described above with regard to FIGS. 2A and 3A, the network computing provider 107 may cause an instantiation of a network computing component for obtaining and processing content associated with the second web page. In other embodiments, a new browse session request may be generated by the client computing device 102 corresponding to sections of a network resource (e.g., frames of a Web page), individual network resources, or embedded resources themselves, data objects included in a set of content, or individual network resources.

Illustratively, the additional browse session request may include any number of pieces of data or information including, but not limited to, information associated with a user, information associated with the client computing device 102 (e.g., hardware or software information, a device physical or logical location, etc.), information associated with the network 108, user or browser preferences (e.g., a requested remote session browse protocol, a preference list, a decision tree, or other information), information associated with the network computing provider 107, information associated with one or more pieces of requested network content (e.g., the network address of a network resource), etc. Requested content may include any manner of digital content, including Web pages or other documents, text, images, video, audio, executable scripts or code, or any other type of digital resource.

As illustrated in FIG. 6A, subsequent to the receipt of the browse session request the network computing provider 107 may select an associated network computing component such as NCC POP 142 to service the browse session request. As discussed above with reference to FIG. 2A, a network computing provider 107 may select an NCC POP to service a browse session request based on any number of factors, including, but not limited to available NCC POP resources (e.g., available memory, processor load, network load, etc), a financial cost of servicing the browse session request at the NCC POP, the NCC POP location respective to a client computing device 102, content provider 112, or CDN POP 116, a NCC POP cache status (e.g., whether a requested resource is already stored in an NCC POP cache), etc. In one embodiment, the network computing provider 107 may select a number of NCC POPs to service a browse session request. Illustratively, although the network computing provider 107 is depicted here for purposes of illustration as selecting NCC POP 142, the network computing provider 107 may select any extant NCC POP to service the browse session request. For example, a single client computing device 102 may simultaneously or sequentially provide three different browse session requests to the network computing provider 107 corresponding to different network resources. The network computing provider 107 may select different NCC POPs for each browse session request, the same NCC POP for all three browse session requests, or any combination thereof. As discussed above, the decision whether to select a different NCC POP than was utilized for a previous or simultaneous browse session request may be made on the basis of available system resources, randomly, or according to any other factor as discussed above and with regards to FIG. 2A.

Figure 6B:
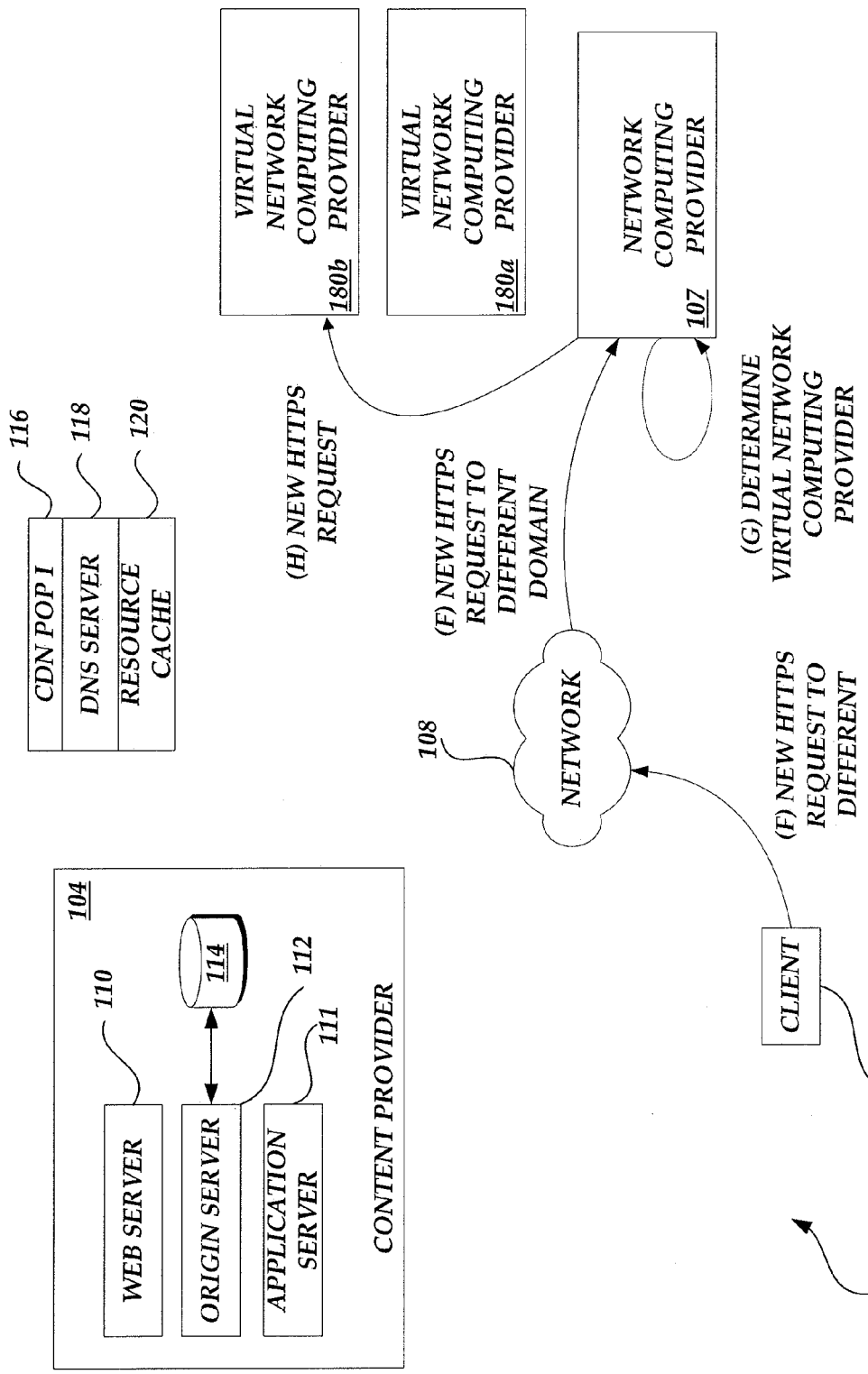
FIG. 6B is a block diagram of the content delivery environment of FIG. 1A illustrating the routing of a request to a different virtual network computing provider associated with a different domain.

As illustrated in FIG. 6B, subsequent HTTPS requests can be made for resources from different content sources. When the content source has control of the virtual network computing provider 180a that processed the previous HTTPS request, subsequent HTTPS requests are not sent to the same virtual network computing provider 180a for security reasons. Rather, they can be routed to a separate virtual network computing provider 180b for processing. For example, if the previous request was to a bank which managed a virtual network computing provider 180a and the subsequent request was to a social networking service, the subsequent request can be initially sent to a general network computing provider 107 which determines which virtual network computing provider 180b, if any, is managed by the social networking service. The network computing provider 107 can then pass the HTTPS request to the appropriate virtual network computing provider 180b.

In some embodiments, the end user of the client computing device 102 can decide to bypass any network computing provider 107 or virtual network computing provider 180a, 180b. Rather, the end user can decide to send all HTTPS requests, or all requests regardless of security status, directly to the content source. The end user can accomplish this by clicking a button, such as the direct communication button 704 illustrated in FIG. 7. An icon or some other indication can be displayed in a visible portion of the browser interface when operating in such a direct communication mode. For example, the icon of the direct communication button 704 can also be displayed in a title bar 706, as illustrated in FIG. 7.

Figure 7:
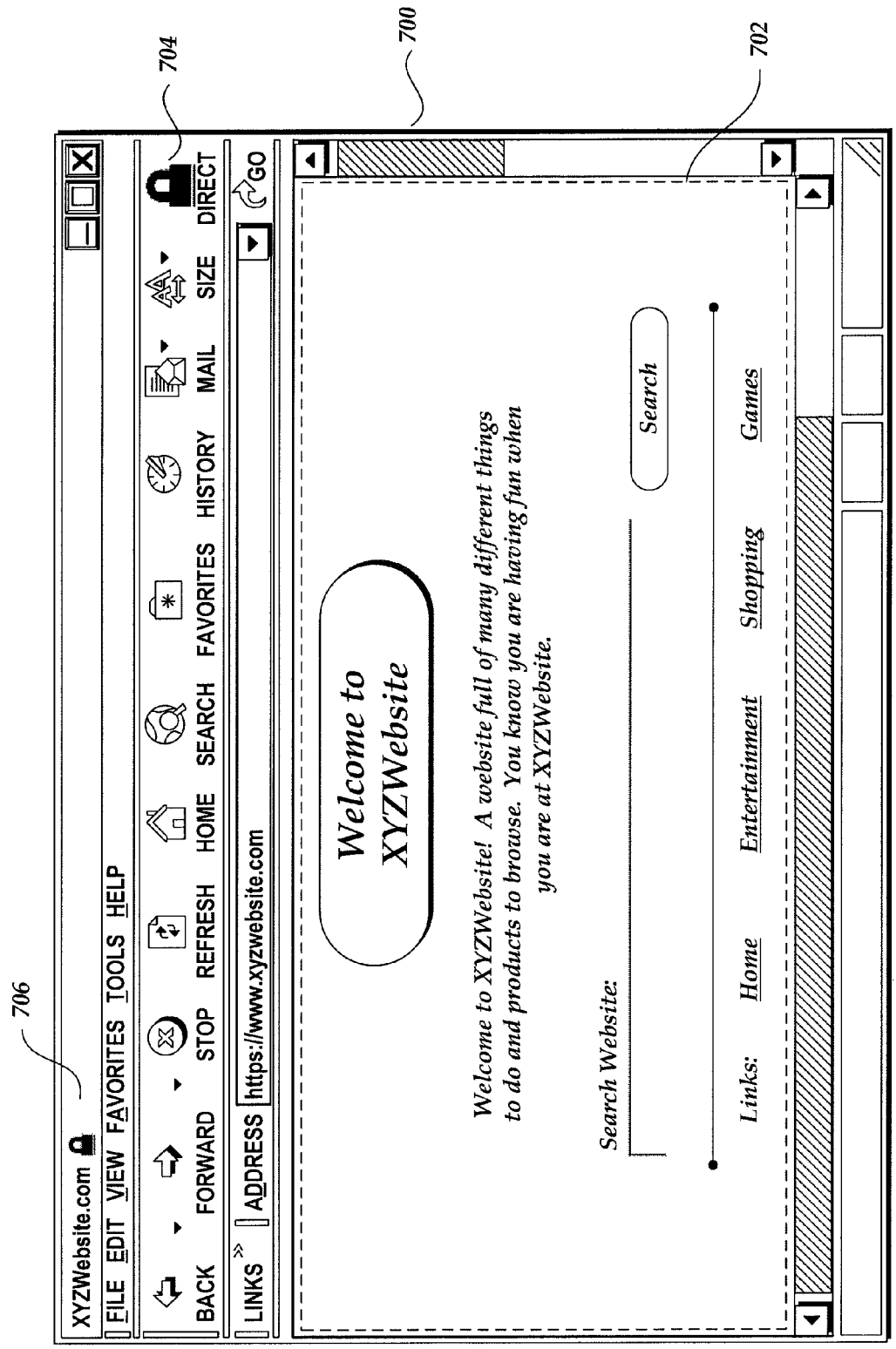
FIG. 7 is a user interface diagram depicting an illustrative browser interface and display of browse session content.

FIG. 7 is a user interface diagram depicting an illustrative browser interface and display of browse session content. As described above with reference to FIG. 5A, a browser 700 may have a content display area 702, as well as one or more one or more local interface components. These local interface components may include toolbars, menus, buttons, address bars, scroll bars, window resize controls, or any other user interface controls. For example, the local interface components can include a direct communication button 704 and a title bar 706. Illustratively, local interface components may be displayed as separate from the content display area or may be overlaid or embedded in the content display area.

Interactions with local interface components may be treated as local user interactions or remote user interactions depending on the processing required by the interaction and the remote session browsing configuration. For example, the selection of a preferences option in a browser menu may be handled entirely as a local user interaction by a browser. The processing required to display the menu, provide visual feedback regarding the selection, display the preferences window, and process the changes made to the browser preferences may be performed locally. As discussed above, processing user interactions locally may provide greater responsiveness at the browser as opposed to sending user interaction data to the NCC POP 142 for processing. As another example, when using a remote session browsing configuration that specifies extensive processing on the NCC POP 142 (e.g., a remote session browsing configuration using a remote session communication protocol such as RDP), the selection of a content refresh button in a browser toolbar may be handled both as a local user interaction and a remote user interaction. The limited processing required to provide interface feedback corresponding to the button selection may be handled at the client computing device 102 in order to provide the appearance of interface responsiveness, while the refresh command, which may require processing of the network content displayed in the content display area of the browser, may be sent as user interaction data to the NCC POP 142 for processing. The NCC POP 142 may then transmit updated processing results corresponding to the refreshed network content back to the client computing device 102 for display.

Figure 8:
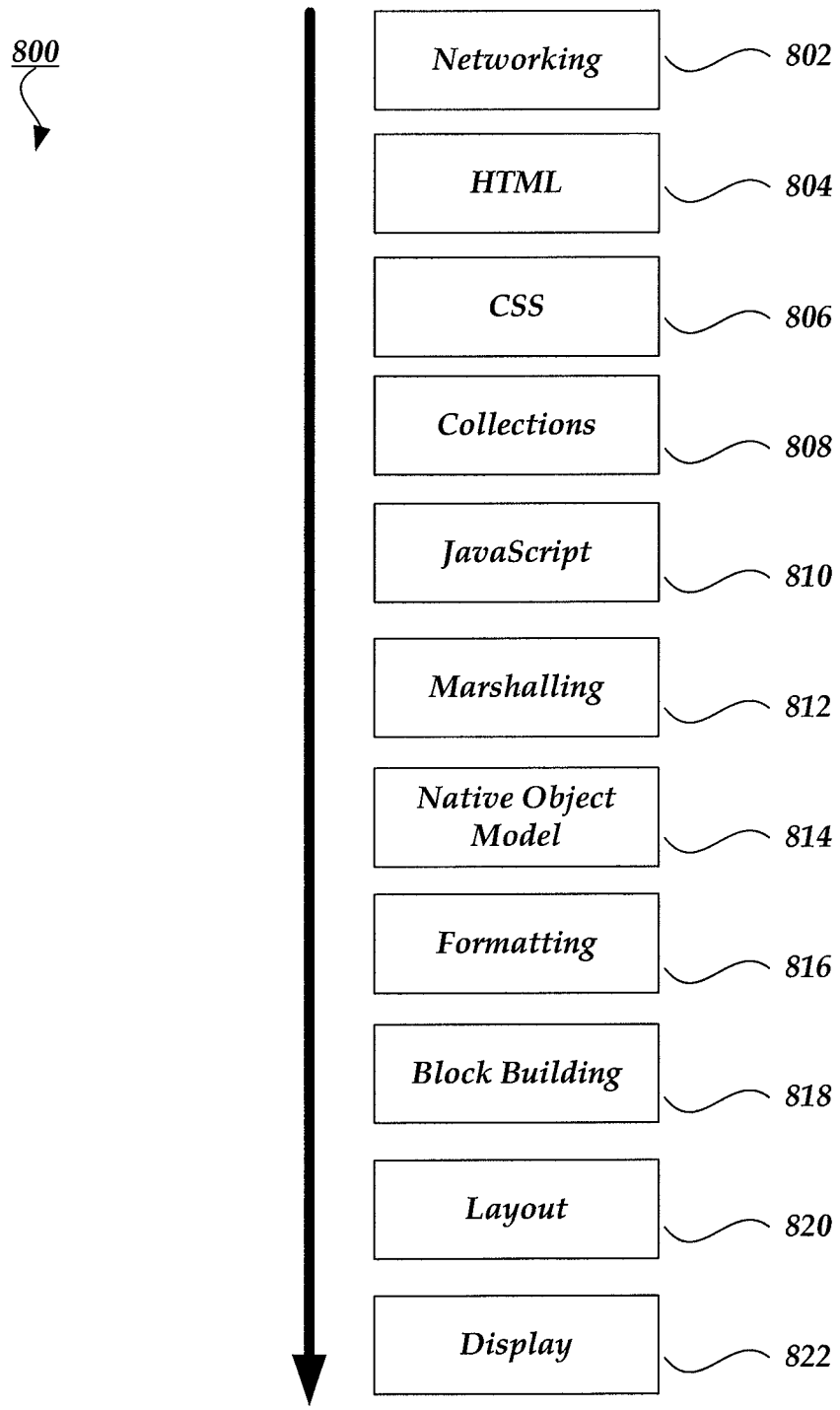
FIG. 8 is a diagram depicting illustrative browser content processing actions as a series of processing subsystems.

FIG. 8 is a diagram depicting illustrative browser content processing actions as a series of processing subsystems 800. In many embodiments, a browser may process sets of content (e.g., network resources such as web pages and associated embedded resources) in a series of processing actions. Illustratively, and as described above with reference to FIGS. 3A-5A, a remote session browsing configuration may specify a split between processing actions performed at a network computing provider (e.g., an NCC POP) and processing actions performed at a client computing device 102. This split may designate some processing actions to be performed by each of the NCC POP and client computing device 102, or may assign all processing actions to a single device or component. For example, an NCC POP may perform all of these various processing actions at the browse session instance, and send fully processed RDP processing results to the client computing device 102 for bitmap assembly and display. Any number of different remote session browsing configurations may be used by one or more browse sessions instances running at an NCC POP.

One of skill in the relevant art will appreciate that the subsystems shown here are depicted for the purpose of illustration, and are not intended to describe a necessary order or a definitive list of browser subsystems. Various browser software components may implement additional or fewer browser subsystems than are shown here, and may order the subsystems or corresponding processing actions in any number of different ways. Although the processing subsystems 800 depicted here for purposes of illustration are directed at the processing of Web pages or other Web content, one of skill in the relevant art will appreciate that the processing of other file types or network resources may be broken up in a similar manner. For example, one of skill in the relevant art will appreciate that a similar schema may be developed for the processing of images, video, audio, database information, 3d design data, or any other file format or type of data known in the art. Similar schema may also be developed for any number of device operating system or software framework processing operations, such as scheduling, memory or file management, system resource management, process or service execution or management, etc. Further, although the HTML protocol and RDP remote session communication protocols are discussed herein for the purposes of example, one of skill in the relevant art will appreciate that a remote session browsing configuration may implement any number of remote communication protocols for any number of specified processing actions, and that a remote session browsing configuration may be formulated to perform any fraction or combination of the actions identified below at any combination of the client computing device 102 and network computing provider 107.

Illustratively, the first processing subsystem involved in the processing and display of network content is the networking subsystem 802. Illustratively, the networking subsystem 802 may be responsible for all communication between the browser and content provider, including local caching of Web content. The networking subsystem is generally limited by the performance of the user's network. A remote session browsing configuration that splits processing actions at the networking subsystem 802 might include a remote session browsing configuration utilizing an HTML remote session communication protocol, where one or more caching or resource retrieval actions were performed at the NCC POP, but parsing and processing of the content was performed at the client computing device.

As network resources such as HTML documents are downloaded from the server they may be passed to an HTML subsystem 804 which parses the document, initiates additional downloads in the networking subsystem, and creates a structural representation of the document. Modern browsers may also contain related subsystems which are used for XHTML, XML and SVG documents. A remote session browsing configuration that splits processing actions at the HTML subsystem 804 might include a remote session browsing configuration utilizing an HTML remote session communication protocol, where an initial HTML page is processed at the NCC POP in order to extract embedded resource identifiers, but additional parsing and processing of the content is performed at the client computing device. In another embodiment, a remote session browsing configuration that splits processing actions at the HTML subsystem 804 might perform initial processing to create the structural representation of the HTML document, and provides a processing result including the structural representation and associated embedded resources to the client computing device for processing.

When CSS is encountered, whether inside an HTML document or an embedded CSS document, it may be passed to a CSS subsystem 806 to parse the style information and create a structural representation that can be referenced later. Illustratively, a remote session browsing configuration that splits processing actions at a CSS subsystem 806 may construct a processing result including the CSS structural representation and HTML structural representation, and provide the processing result and associated embedded resources to the client computing device for processing.

HTML documents often contain metadata, for example the information described in a document header or the attributes applied to an element. The collections subsystem 808 may be responsible for storing and accessing this metadata. A remote session browsing configuration that splits processing actions at a collections subsystem 808 may construct a processing result including processed metadata along with any other structural representations discussed above, and provide the processing result and associated embedded resources to the client computing device for processing.

When Javascript is encountered, it may be passed directly to a JavaScript subsystem 810 responsible for executing the script. The Javascript subsystem 810 has been examined fully over the years, and may be one of the most well known browser subsystems in the art. A remote session browsing configuration that splits processing actions at a Javascript subsystem 810 may construct a processing result including an internal representation of one or more Javascript scripts, including, but not limited to state data or a representation of the script in a native or intermediate form, as well as any other processed structures or data discussed above, and provide the processing result and associated embedded resources to the client computing device for processing.

Because many JavaScript engines are not directly integrated into the browser, there may be a communication layer including the marshalling subsystem 812 between the browser and the script engine. Passing information through this communication layer may generally be referred to as marshaling. A remote session browsing configuration that splits processing actions at a marshalling subsystem 812 may construct a processing result including marshalling data as well as any other processed structures, scripts, or data discussed above, and provide the processing result and associated embedded resources to the client computing device for processing.

In some embodiments, JavaScript interacts with an underlying network resource such as a Web document through the Document Object Model APIs. These APIs may be provided through a native object model subsystem 814 that knows how to access and manipulate the document and is the primary interaction point between the script engine and the browser. Illustratively, a remote session browsing configuration that splits processing actions at a native object model subsystem 814 may construct a processing result including native object model state data or API calls as well as any other processed structures, scripts, or data discussed above, and provide the processing result and any other associated embedded resources to the client computing device for processing.

Once the document is constructed, the browser may needs to apply style information before it can be displayed to the user. The formatting subsystem 816 takes the HTML document and applies styles. Illustratively, a remote session browsing configuration that splits processing actions at a formatting subsystem 816 may construct a processing result including an HTML representation with applied styles, as well as any other processed state data, API calls, structures, scripts, or data discussed above, and provide the processing result and any other associated embedded resources to the client computing device for processing.

In one embodiment, CSS is a block based layout system. After the document is styled, the next step, at a block building subsystem 818, may be to construct rectangular blocks that will be displayed to the user. This process may determine things like the size of the blocks and may be tightly integrated with the next stage, layout. A remote session browsing configuration that splits processing actions at a block building subsystem 818 may construct a processing result including block information, as well as any other processed state data, API calls, structures, scripts, or data discussed above, and provide the processing result and any other associated embedded resources to the client computing device for processing.

Subsequent to the browser styling the content and constructing the blocks, it may go through the process of laying out the content. The layout subsystem 820 is responsible for this algorithmically complex process. Illustratively, a remote session browsing configuration that splits processing actions at a layout subsystem 820 may process the various state data, API calls, structures, scripts, or data discussed above to construct a processing result including layout information for the client computing device. Illustratively, an NCC POP may make use of various data or settings associated with the client computing device or browser (e.g., as provided in the initial browse session request) in order to generate a suitable layout for the client computing device. For example, a mobile device may provide a screen resolution and a display mode to the NCC POP. The NCC POP may base layout calculations on this screen resolution and display mode in order to generate a processing result corresponding to a content representation suitable for a browser running on the mobile device. Illustratively, in various embodiments, any other subsystem implemented by the NCC POP may make use of data associated with the client computing device or browser in generating a processing result for the client.

The final stage of the process may occur inside the display subsystem 822 where the final content is displayed to the user. This process is often referred to as drawing. A remote session browsing configuration that splits processing actions at the networking subsystem 802 might include a remote session browsing configuration utilizing an RDP remote session communication protocol, where nearly all processing is performed at the NCC POP, and a processing result including bitmap data and low level interface data are passed to the client computing device for display.

Figure 9:
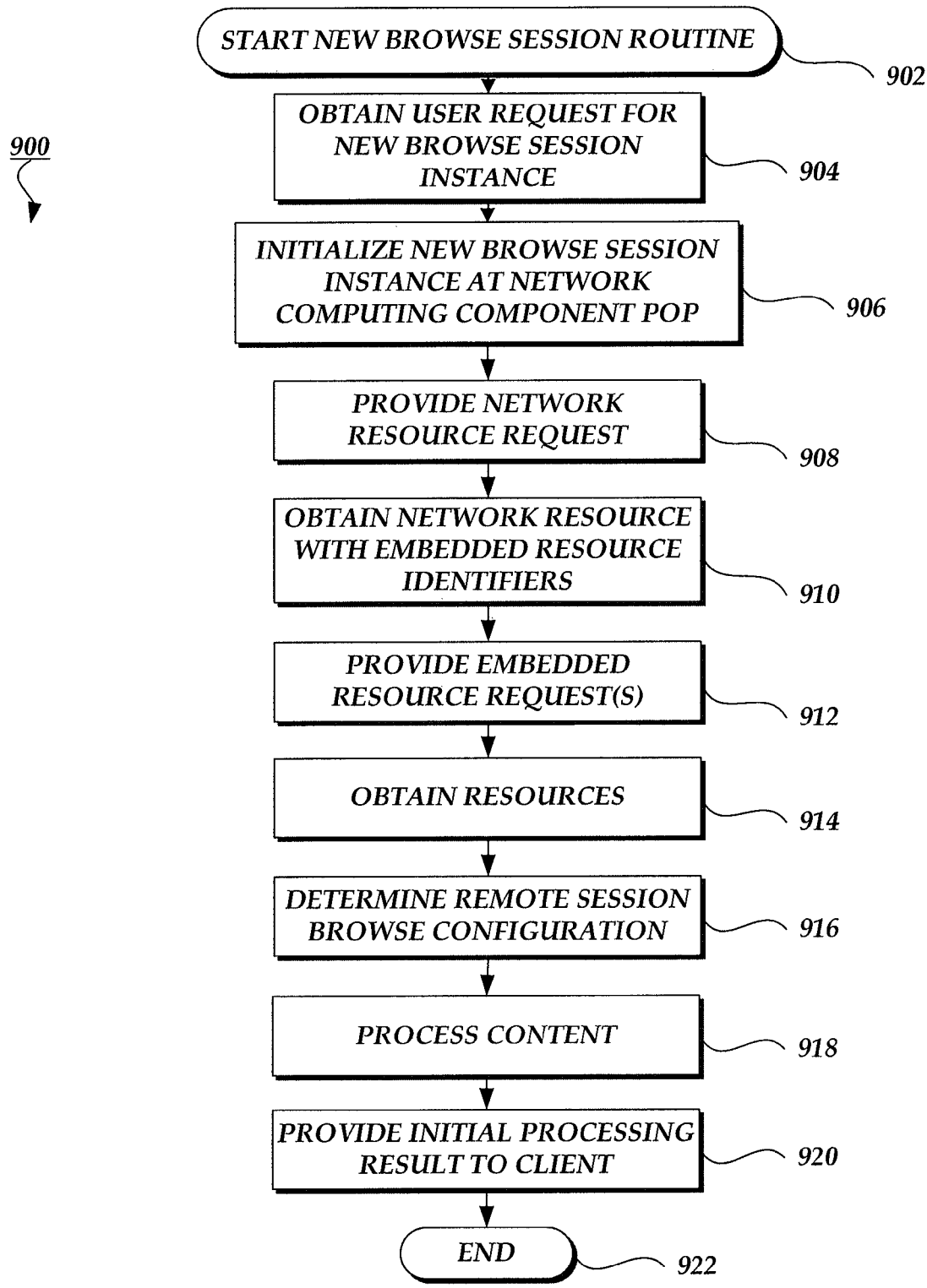
FIG. 9 is a flow diagram illustrative of a new browse session routine implemented by network computing provider.

FIG. 9 is a flow diagram illustrative of a new browse session routine 900 implemented by network computing provider 107 of FIG. 1A. New browse session routine 900 begins at block 902. At block 904, the network computing provider 107 receives a new browse session request from client computing device 102. As previously described, the client computing device 102 may load a browser for viewing network content in response to an event or user request. Subsequent to the browser being loaded, the browser may be implemented request a new browse session. From the perspective of the user of the client computing device, the request for the new browse session corresponds to the intended request to transmit the request to one or more corresponding content providers 104. Illustratively, this request may be generated automatically as a result of the browser loading (e.g., a request for a default or "home" page), or may be generated as a result of a user following a link or entering a network address into an address bar. This browse session request may include one or more addresses or references to various network resources or other content requested by the client computing device 102. In an illustrative embodiment, the browse session request is transmitted in accordance with an API.

At block 906 the network computing provider 107 may select an associated NCC POP to instantiate a new browse session based on the browse session request. As discussed above with reference to FIG. 1A, a network computing provider 107 may include any number of NCC POPs distributed across any number of physical or logical locations. A network computing provider 107 may select a NCC POP to service a browse session request based on any number of factors, including, but not limited to available NCC POP resources (e.g., available memory, processor load, network load, etc.), a financial cost of servicing the browse session request at the NCC POP, the NCC POP location respective to a client computing device 102, content provider 104, or CDN POP 116, a NCC POP cache status (e.g., whether a requested resource is already stored in an NCC POP cache), etc.

In one embodiment, the network computing provider 107 may select a number of NCC POPs to service a browse session request. For example, the network computing provider 107 may select two NCC POPs with different logical locations in the network. Each NCC POP may independently request and process network content on the behalf of the client computing device 102, and the client computing device 102 may accept data from the first NCC POP to return a processing result. Subsequent to being selected by the network computing provider 107, NCC POP 142 may obtain the browse session request. In one embodiment, NCC POP 142 may have the browse session request forwarded to it by a component of network computing provider 107. In another embodiment, NCC POP 142 or client computing device 102 may receive connection information allowing the establishment of direct communication between NCC POP 142 and client computing device 102. Illustratively, NCC POP 142 may be provided with the browse session request originally provided to network computing provider 107, may be provided with a subset of information (e.g., just a network address of requested content), or may be provided additional information not included in the original browse session request.

Subsequent to the NCC POP 142 being selected, the network computing provider 107 may cause the NCC POP 142 to instantiate a new browse session. Illustratively, instantiating a new browse session instance may include loading a new virtual machine instance and/or browser instance at the NCC POP 142, reserving or allocating device memory, storage or cache space, processor time, network bandwidth, or other computational or network resources for the new browse session. Illustratively, one or more characteristics of the new browse session instance and/or browser instance may be based on client computing device 102 information included in the browse session request. For example, the browse session request may include a device type or browser type, a device screen resolution, a browser display area, or other information defining the display preferences or capabilities of the client computing device 102 or browser. The NCC POP 142 may accordingly instantiate a virtual machine instance and/or a browser instance with the same or similar capabilities as the client computing device 102. Illustratively, maintaining a virtual machine instance and/or browser with the same or similar capabilities as the client computing device 102 may allow the NCC POP 142 to process network content according to the appropriate dimensions and layout for display on the particular client computing device 102.

In some embodiments, the NCC POP 142 may utilize an existing virtual machine instance and/or browser instance in addition to, or as an alternative to, instating a new browse session. For example, subsequent to the NCC POP 142 being selected, the network computing provider 107 may cause the NCC POP 142 to associate an existing browser instance and/or virtual machine instance, such as one or more instances previously instantiated at the NCC POP 142, with the new browse session request. Illustratively, an existing browser session and/or virtual machine instance may correspond to another browse session, remote application session, or other remote process associated with the user or client computing device 102, or may be a previously instantiated software instance from an unrelated browse session or remote process. In other embodiments, the NCC POP 142 may instantiate a new browser or other application process in an existing virtual machine instance, or may combine the utilization of previously instantiated and newly instantiated software processes in any number of other ways. In still further embodiments, the network computing provider or NCC POP 142 may instantiate any number of new virtual machine instances and/or browser instances (or make use of existing instantiated instances) based on a single browse session request.

At block 908 the network computing provider 107 may provide a request for one or more network resources to a content provider or CDN service provider based on a network address included in the browse session request. In various embodiments, one or more network resources may be additionally or alternately retrieved from a cache local to the NCC POP 142 or otherwise associated with the network computing provider 107. One of skill in the art will appreciate that, in the case of other embodiments, the link or network address may correspond to a document or file stored in a digital file locker or other network storage location or at a cache component associated with the network computing provider 107 or client computing device 102. In some embodiments, the new session request may include a document or file in addition to or as an alternative to a network address. At block 910, the network computing provider 107 obtains the one or more network resources. Subsequent to obtaining the requested network resource, the NCC POP 142 may process the network resource to extract embedded resource identifiers.

At block 912, the network computing provider 107 may provide resource requests to one or more sources of content such as content providers, CDN service providers, and caches. The resource requests may correspond to embedded resources based on the one or more embedded resource identifiers extracted from the one or more network resource as described in block 910 above. At block 914, the network computing provider 107 may obtain these embedded resources from any number of different sources, sequentially or in parallel.

At block 916, the network computing provider 107 may process the one or more network resources and associated embedded resources to determine a remote session browsing configuration for the processing and communication of content to the client computing device 102. A remote session browsing configuration may include any proprietary or public remote protocol allowing exchange of data and user interactions or requests between a client and a remote server. The remote session browsing configuration may illustratively include both a remote session communication protocol and a processing schema for providing processed (or unprocessed) content to a client computing device for display in the content display area of a browser.

Illustratively, a remote session browsing configuration may define or specify a remote session communication protocol, including, but not limited to, a network protocol, signaling model, transport mechanism, or encapsulation format for the exchange of state data, user interactions, and other data and content between the network computing provider and the client computing device. Examples of remote session communication protocols known in the art include Remote Desktop Protocol (RDP), X-Windows protocol, Virtual Network Computing (VNC) protocol, Remote Frame Buffer protocol, HTML, etc. For example, RDP illustratively specifies a number of processing mechanisms for encoding client input (e.g., mouse movement, keyboard input, etc.) into protocol data units for provision to a remote computing device, and corresponding mechanisms for sending bitmap updates and low level interface information back to the client device. As another example, the HTML protocol illustratively provides a mechanism for providing files defining interface information and containing resources references from a server to a client, and a corresponding mechanism for a client computing device to provide requests for additional files and resources to the server. In one embodiment, the NCC POP 142 may provide an initial communication to the client computing device 102 after determining the remote session communication protocol. This initial communication may allow the client computing device 102 to prepare to receive communications in the selected remote session communication protocol, and, in the case of pull remote session communication protocols like HTTP, may cause the client computing device to send an initial resource request to the browse session instance running on the NCC POP 142.

Each remote session browsing configuration may additionally define a split of processing actions between the network computing and storage service (e.g., NCC POP 142) and the client computing device (e.g., client computing device 102). In one embodiment, a particular split of processing actions may be based on or mandated by a particular remote session communication protocol. In another embodiment, a remote session communication protocol may allow several different splits of processing actions depending on the implementation or configuration of the protocol. For the purpose of illustration, many pieces of network content (e.g., Web pages, video, Flash documents) may require various processing actions before being displayed on a computing device. A Web page, for example, may be parsed to process various HTML layout information and references to associated resources or embedded content such as CSS style sheets and Javascript, as well as embedded content objects such as images, video, audio, etc. The HTML and each referenced object or piece of code will typically be parsed and processed before a representative object model corresponding to the Web page may be constructed. This object model may then be processed further for layout and display in a content display area of a browser at the client computing device 102. Illustrative browser processing actions are described in greater detail below with reference to FIG. 8. One of skill in the art will appreciate that, in the case of other embodiments or applications, various other processing actions may be required.

A remote session browsing configuration may specify that various of the processing actions required for display of piece of network content be performed at the remote computing device, such as the NCC POP 142, rather than at the client computing device 102. Network content partially (or wholly) processed at the network computing provider may be referred to as a processing result. As discussed below, the split of processing actions may be associated with or linked to the remote session communication protocol used for exchanging data and client input between the NCC POP 142 and client computing device 102.

For example, a remote session communication protocol such as RDP that transmits a processing result including low level interface information and bitmaps to the client computing device 142 for display may be associated with a remote session browsing configuration that specifies performing all, or nearly all, of the necessary content processing actions at the NCC POP 142. While using RDP, the NCC POP 142 may, for example, run a full instance of a browser the NCC POP 142 and transmit a processing result consisting of bitmap updates corresponding to a representation of the displayed content to the client computing device 102. The client computing device 102, in this example, may merely be required to assemble the transmitted bitmap updates for display in the content display area of the browser, and may perform none of the processing of the actual HTML, Javascript, or data objects involved in the display of an illustrative piece of network content. As another example, a remote session browsing configuration utilizing a remote session communication protocol such as HTML may transmit network content in a largely unprocessed form. The client computing device 102 may thus perform all of the processing actions required for display of network content while the NCC POP 142 performs little or no processing.

The NCC POP 142 may base its determination of a remote session browsing configuration on any number of factors, including, but not limited to, one or more characteristics of one or more of the requested resources, content provider 104, or CDN service provider 106, one or more characteristics of the content address or domain, one or more characteristics of the client computing device 102, browser or application, user, one or more characteristics of the NCC POP 142, or one or more characteristics of the network or network connection, etc. Characteristics of requested resources may include, but are not limited to, a data format, a content type, a size, processing requirements, resource latency requirements, a number or type of interactive elements, a security risk, an associated user preference, a network address, a network domain, an associated content provider, etc. Characteristics of a content provider 104, CDN service provider 106, computing device 102, or NCC POP 142 may include, but are not limited to, processing power, memory, storage, network connectivity (e.g., available bandwidth or latency), a physical or logical location, predicted stability or risk of failure, a software or hardware profile, available resources (e.g., available memory or processing, or the number of concurrently open software applications), etc. The NCC POP 142 may further consider perceived security threats or risks associated with a piece of content or domain, preferences of a client computing device or a content provider, computing or network resource costs (e.g., a financial cost of processing or bandwidth, resource usage, etc.), predetermined preferences or selection information, any additional processing overhead required by a particular remote session browsing configuration, a cache status (e.g., whether a particular resources is cached at a NCC POP 142, at the client computing device 102, or at other network storage associated with the network computing provider), a predicted delay or time required to retrieve requested network content, a preferred content provider or agreements with a content provider for a particular remote session browsing configuration or level of service, a remote session browsing configuration being used for another (or the current) browse session by the same user, or any other factor.

In some embodiments, an NCC POP 142 may base a determination of a remote session browsing configuration on past behavior or practice. For example, an NCC POP 142 that has determined a remote browse session configuration for a particular resource in the past may automatically select the same remote browse session configuration when the resource is requested by the same (or potentially a different) user. As another example, a user that has a history of frequently accessing Web sites with extensive processing requirements may automatically be assigned a remote session browsing configuration that performs the majority of processing at the NCC POP 142. In other embodiments, an NCC POP 142 may base a determination of a remote browse session configuration on predictions of future behavior. For example, an NCC POP 142 may base its determination of a remote browse session configuration for a particular resource on an analysis of past determinations made for a particular Web site, network domain, or set of related resources. A content provider that historically has provided video-heavy Web pages may be associated with a remote session browsing configuration that emphasizes video performance at the client computing device 102. Illustratively, past historical analysis and future predictions may be considered as one or more of a number of factors on which to base the remote session browsing configuration determination process, or may be definitive in the decision making process. For example, once an NCC POP 142 determines a remote session browsing configuration for a particular content provider, it may skip the remote session browsing configuration determination process for any future resources served from the content provider. Illustratively, the NCC POP 142 may re-determine a remote session browsing configuration to be associated with the content provider after a fixed period of time, or after the NCC POP 142 has identified or determined a change in the content being served by the content provider.

In other embodiments, a network resource, Web site, network domain, content provider, or other network entity may specify or otherwise request the use of a particular remote browse session configuration in a resource tag, metadata, or other communication with an NCC POP 142. The NCC POP 142 may treat the request as definitive, or may consider the request as one of multiple factors to be considered in the decision making process.

For example, a remote session browsing configuration utilizing a remote session communication protocol such as RDP may specify extensive processing to occur at the network computing provider 107 (e.g., at NCC POP 142) rather than at the client computing device 102. The remote session browsing configuration may thus leverage the processing power of the NCC POP 142 to achieve lower latencies and presentation delay when dealing with network content that requires a great deal of pre-processing (e.g., content with a great deal of CSS or Javascript information defining page layout). The NCC POP 142 may therefore select a remote session browsing configuration that performs a substantial amount of processing at the network computing provider 107 and utilizes RDP or a similar remote session communication protocol for communication of processing-intensive content. Conversely, a remote session browsing configuration that utilizes a remote session communication protocol such as HTML may specify extensive processing at the client computing device 102 rather than at the network computing provider 107. The remote session communication protocol may thus achieve smaller delays and smoother presentation when presented with simple network content that requires very little processing or network content that requires rapid change in displayed content after its initial load. For example, a Web page with embedded video may perform better performing the majority of processing locally and utilizing HTML rather than RDP as a remote session communication protocol. A remote session browsing configuration specifying extensive processing at the network computing provider 107 must process the video at the NCC POP 142 and rapidly send screen updates (e.g. by RDP) to the client computing device 102, potentially requiring a great deal of bandwidth and causing choppy playback in the browser, while a remote session browsing configuration specifying local processing may provide raw video information directly to the client computing device 102 for display (e.g. by HTML), allowing for client side caching and a smoother playback of content.

As a further example, the NCC POP 142 in communication with a client computing device 102 with extremely limited processing power may elect to use a remote session browsing configuration that requires very little processing by the client computing device, for example, using RDP to transmit NCC POP 142 processed results. Conversely, an NCC POP 142 providing an extremely interactive Web page may elect to use a remote session browsing configuration that allows the client computing device 102 to handle user interactions locally in order to preserve interface responsiveness, for example, using HTML to transmit substantially unprocessed data. As a still further example, a NCC POP 142 may base the determination of a remote session browse configuration on preferences provided by the client computing device 102. A client computing device 102 may illustratively include preferences for a remote session browse configuration in an initial browse session request, or at any other time. The NCC POP 142 may utilize these preferences as an alternative to, or in addition to any other factor or decision metric. Illustratively, allowing the client computing device 102 to set or influence the selection of a remote session browse configuration allows the NCC POP 142 to take user preferences in account when determining a remote session browse configuration. For example, a user worried about initial page load times may prefer to use a remote session browsing configuration heavy on remote processing and utilizing an RDP remote session communications protocol, while a user wishing to maintain an extremely responsive interface may prefer using a remote session browsing configuration that performs the majority of the processing on the client computing device 102, for example, using an HTML remote session communication protocol.

Illustratively, the NCC POP 142 may base a determination of a remote browsing configuration on any factor or combination of factors. For example, the NCC POP 142 may select a remote session browsing configuration based on a single factor, or may assign weights to one or more factors in making a determination. In some embodiments, the determination process of the NCC POP 142 may change based on one or more factors described above. For example, an NCC POP 142 communicating with a client computing device 102 over a network with a surplus of unused bandwidth may give a low weight to factors such as the network requirements of a remote browse session, and may give a higher weight to factors such as the latency of page interactions, while an NCC POP 142 communicating with a client computing device 102 over a limited bandwidth network may give a higher weight to factors dealing with the efficiency of the remote session browse protocol over a network.

In one embodiment, the NCC POP 142 may select a single remote session browsing configuration for a set of network content. For example, the NCC POP 142 may select a single remote session browsing configuration for a requested network resource such as a Web page. The NCC POP 142 may thus process the Web page together with all embedded content based on the selected remote browsing session protocol, and utilize the remote browsing session protocol to exchange user interaction data and updated browse session data for all embedded content associated with the Web page. In another embodiment, the NCC POP 142 may select different remote session browsing configurations for one or more resources in a set of network content. For example, a network resource such as a Web page may reference processing intensive embedded Javascript or CSS resources, as well as embedded video resources. The NCC POP 142 may select a first remote session browsing configuration for the Web page and all embedded resources excluding the embedded video resource, and a second remote session browsing configuration for the embedded video resource. Illustratively, this may result in the NCC POP 142 utilizing RDP to send a processing result to the client computing device 102 for display of the Web page and associated embedded resources, while utilizing HTTP to send the embedded video as a separate, unprocessed file. In one embodiment, the client computing device 102 may perform the minimal processing required to display the RDP processing result corresponding to the Web page and embedded resources, and may also perform additional processing necessary to display the embedded video, for example, overlaying the video on top of the displayed RDP representation of the Web page. Any number of remote session browsing configurations may be selected to correspond to any number of resources or objects included in a set of network content, regardless of whether resources or objects are obtained from a content provider 104 or CDN service provider 106 in one or more logical files or data structures.

Although the selection of a remote session browsing configuration is illustratively depicted herein as occurring after all network resources and associated embedded content have been obtained by the NCC POP 142, one skilled in the relevant art will appreciate that the selection of a remote session browsing configuration may be performed at any time. For example, the NCC POP 142 may select a remote session browsing configuration after receiving a new browse session request or related information from the client computing device, may select a remote session browsing configuration after obtaining a network resource, but before obtaining any associated embedded resources, or at any other time. In some embodiments, the NCC POP 142 may switch to a new remote session browsing configuration at some time subsequent to the client computing device 102 obtaining an initial processing result. Illustratively, the NCC POP 142 selecting a new remote session browsing configuration may occur automatically after a certain time period or event or in response to a change in network conditions, NCC POP 142 or client computing device 102 load or computing resources, or any other factor described above as potentially influencing the choice of remote session browsing configuration. Illustratively, an NCC POP 142 dealing with other types or formats of information may select a remote session protocol based on any number of similar factors. For example, one of skill in the relevant art will appreciate that a similar schema may be developed for the processing of images, video, audio, database information, 3d design data, or any other file format or type of data known in the art.

The client computing device 102 may, in various embodiments, further instantiate a parallel browsing process sequentially or simultaneously with the request for a remote browse session. In one embodiment, a client computing device 102 may instantiate a traditional local browse session as known in the art (e.g., providing content requests from the browser and processing obtained resources locally) in addition to one or more remote browse instance executing at an NCC POP 142. In another embodiment, a client computing device 102 may be provided with unprocessed network resources by the NCC POP 142. Illustratively, the network resources may have been retrieved from one or more content providers, CDNs, or cache components by the NCC POP 142. The resources may be provided to the client computing device 102 to process locally in parallel with the remote browse instance executing at the NCC POP 142. In still further embodiments, the network computing provider or NCC POP 142 may instantiate any number of new virtual machine instances and/or browser instances (or make use of existing instantiated instances) to process resources and/or send processing results to the client computing device 102 in parallel. Illustratively, the local browse session at the client computing device 102 and the remote browse session instance at the NCC POP 142 may execute in parallel.

In one embodiment, a local browse session executing at the client computing device 102 may obtain unprocessed content (e.g., html Web pages, embedded content, and other network resources) from the NCC POP 142 responsive to a browse session request. Illustratively, the content may have been retrieved by the NCC POP 142 from a content provider, CDN, or cache in response to the browse session request. The unprocessed content provided by the NCC POP 142 may include all the content associated with the browse session request or may supplement content existing in a cache of the client computing device, retrieved from a content provider or CDN, or obtained from some other source. In one embodiment, a client computing device 102 may obtain all requested content from a local cache, and may not obtain any unprocessed resources or content from the NCC POP 142. Subsequent to obtaining the unprocessed content, client computing device 102 may process the requested content in parallel with a remote browse session executing at the NCC POP 142. For example, as the local browse session executing at the client computing device 102 is processing the requested content, a remote browse session executing at the NCC POP 142 may be processing the same content at substantially the same time. Once the NCC POP 142 has performed a set of processing actions on the content to generate a processing result (e.g., as specified by a determined remote session browsing configuration), the NCC POP 142 may provide the processing result to the client computing device 102.

For the purpose of illustration, a client computing device 102 may require a longer load time to obtain and process requested network resources than a browse session instance running at the NCC POP 142. For example, the NCC POP 142 may obtain and process content quickly due to its position on the network and the relative processing power of the local client computing device as compared to the NCC POP 142. Even if the NCC POP 142 provides the client computing device 102 with all requested network content, the client computing device 102 may still obtain a processing result from NCC POP 142 before the local browse session has fully completed processing the requested resources. The client computing device 102 may complete any further processing steps and display the obtained processing result before completing local processing and display of the content. Illustratively, this may allow the client computing device 102 to take advantage of an NCC POP 142's quicker content load time relative to a traditional local browse session. Prior to the local browse session completing the processing all requested resources, the browser may process any user interactions locally and/or remotely as described in FIGS. 5A and 11 below.

Once the local browse session has fully obtained and processed resources corresponding to the requested content, the computing device 102 may determine whether to continue to display results obtained from the NCC POP 142 (and process user interactions at the NCC POP 142) using the determined remote session browsing configuration or switch to processing user interactions locally. Switching to process user interactions locally may include replacing a displayed representation of the requested resources based on a processing result obtained from the NCC POP 142 with a local display of the requested resources. For example, a browser may display a representation of a Web page corresponding to a processing result from the NCC POP 142 (e.g., RDP display information representing the rendered page) until the browser is finished processing and rendering the Web page locally. The browser may then replace the representation from the NCC POP 142 with the locally rendered representation of the Web page. Illustratively, replacing one representation with another representation may be transparent to the user. For example, the local and NCC POP 142 representations of the Web page may be identical or substantially identical. In one embodiment, when the NCC POP 142 representation of the web page is displayed, the browser may send various user interactions with the displayed page to the NCC POP 142 for processing. When the locally rendered version of the Web page is displayed, user interactions may be processed locally at the browser. Illustratively, the determination of which representation of the requested resources to display (e.g., local or from the NCC POP 142) may be based on any of the same factors described with reference to determining a remote session browse protocol in above.

In one embodiment, the client computing device 102 may switch to processing user interactions locally as soon as local resources are fully loaded. Illustratively, the remote browse session instance running at the NCC POP 142 may be terminated after switching to local processing, or the remote browse session instance may be maintained as a backup in case of unresponsiveness or a failure with regards to the local browse session. For example, the client computing device 102 may process user interactions locally, as well as sending remote user interaction data to the NCC POP 142 in accordance with the selected remote session browsing configuration. The remote user interaction data may be used by the NCC POP 142 to keep the remote browse session instance fully in parallel with the local browse process being executed by the browser at the client computing device 102. As long as the local browse session continues to handle user interactions, the NCC POP 142 may either refrain from sending updated processing results, or may send updated processing results ignored by the client computing device 102. If a problem develops with the local browse session at the client computing device 102, updated processing results may be provided to the client computing device 102 from the NCC POP 142 for processing and display in lieu of the local browse session. Illustratively, this switch from the local browse session to remote processing may be transparent to the user. In some embodiments, the client computing device 102 may switch from a local browse session to a remote browse session instance based on factors other than unresponsiveness or failure at the local browser. For example, the client computing device 102 or network computing and storage component 107 may select between a remote and local browse session based on any of the factors enumerated with regards to determining a remote session browse protocol above In another embodiment, the client computing device 102 may continue to process and display updated processing results from the NCC POP 142 even after the local browse session has fully loaded the requested content. The client computing device 102 may terminate the local browse session or may run the local browse session in parallel as a backup process in the converse of the example provided above. It should be appreciated that although the local browse session is described here for the purpose of illustration as being slower to load than the remote browse session instance, in some embodiments the local browse session may load the content faster than the remote browsing session, in which case the browser may process user interactions locally until the remote browse process has fully loaded the requested content. In some embodiments, the client computing device 102 may display and process user interactions through whichever browse session, local or remote, loads the requested content first.

In various other embodiments, the network computing provider 107 may instantiate multiple remote browse session instances to run in parallel in addition to or as an alternative to instantiating a local browse session. Illustratively, these parallel browse session instances may utilize any of the same or different remote session browse protocols, and may act as backups in the manner described above with regard to a local browse session, or may be used and switched between as alternatives in order to maximize browser performance at the client computing device 102. For example, in response to one or more browse session requests, the network computing provider 107 may instantiate a browse session instance running on a first NCC POP and utilizing an RDP protocol as well as browse session instance running on a second NCC POP utilizing an X-Windows protocol. The client computing device 102 or the network computing provider 107 may determine which browse session instance and protocol should be used based on performance or resource usage considerations as described with regards to determining a remote session browse protocol above.

With continued reference to FIG. 9, at block 918, the network computing provider 107 may process the obtained content, including the one or more requested network resources and embedded network resources, according to the determined remote session browsing configuration to generate an initial processing result. At block 920, the network computing provider 107 may provide the initial processing result to the client for further processing and display in the content display area of the browser. For the purposes of further example, an illustrative client new browse session interaction routine 1000 implemented by client computing device 102 is described below with reference to FIG. 10. At block 922, the start new browse session routine 900 ends.

Figure 10:
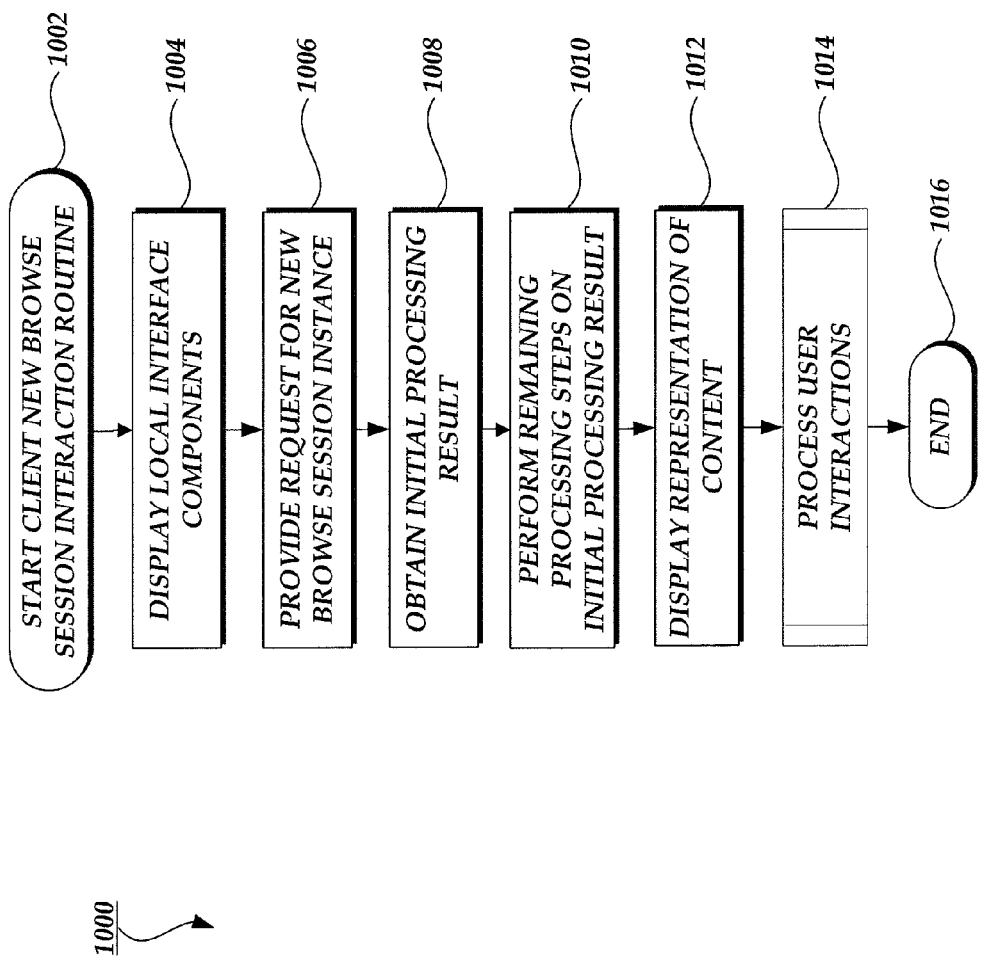
FIG. 10 is a flow diagram illustrative of a client new browse session interaction routine implemented by a client computing device.

FIG. 10 is a flow diagram illustrative of a client new browse session interaction routine 1000 implemented by client computing device 102. New browse session interaction routine 1000 begins at block 1002 in response to an event or user request causing the client computing device 102 to load a browser for viewing network content. At block 1004, the client computing device loads locally managed components of the browser, including all local interface components. As described above with reference to FIGS. 5A and 7, local interface components may include toolbars, menus, buttons, or other user interface controls managed and controlled by the software browser application or any other process executing or implemented locally at the client computing device. At block 1006, the client computing device 102 provides a request for a new browse session instance to the network computing provider 107. From the perspective of the user of the client computing device, the request for the new browse session corresponds to the intended request to transmit the request to one or more corresponding content providers 104. In other embodiment, the new session request may correspond to a request to load a file or other document (e.g., a request to load an image in a photo-editing application, etc.). Illustratively, the request may be generated automatically as a result of the browser loading (e.g., a request for a default or "home" page), or may be generated as a result of a user following a link or entering a network address into an address bar. As illustrated with respect to FIG. 2A, the browse session request is transmitted first to a network computing provider 107. In an illustrative embodiment, the network computing provider 107 utilizes a registration API to accept browse session requests from the client computing device 102.

A browse session request may include any number of pieces of data or information including, but not limited to, information associated with a user, information associated with the client computing device 102 or software on the client computing device (e.g., hardware or software information, a device physical or logical location, etc.), information associated with the network 108, user or browser preferences (e.g., a requested remote session browse protocol, a preference list, a decision tree, or other information), information associated with the network computing provider 107, information associated with one or more pieces of requested network content (e.g., the network address of a network resource), etc. For example, a browse session request from the client computing device 102 may include information identifying a particular client computing device hardware specification or a hardware performance level, latency and bandwidth data associated with recent content requests, a desired security level for processing different types of content, a predetermined preference list of remote session browse protocols, and one or more network addresses corresponding to requested network resources, among others. In another example, the browse session request can include information identifying a client computing device 102 screen resolution, aspect ratio, or browser display area in the browse session request may allow the network computing provider 107 to customize the processing of network content for display on the client computing device. As previously described, the browse session request can include network address information corresponding to a requested network resource, which may be in any form including, but not limited to, an Internet Protocol ("IP") address, a URL, a Media Access Control ("MAC") address, etc. In one embodiment, the request for a new browse session instance may correspond to the network computing provider receiving a request for a new browse session instance at block 904 of FIG. 9 above.

At block 1008, the client computing device 102 obtains an initial processing result from the network computing provider 107. Illustratively, the format and data included in the initial processing result may vary based on the remote session browsing configuration selected by the network computing provider 107. In one embodiment, the initial processing result may include or be preceded by data informing the client computing device 102 of the choice of remote session browsing configuration and/or establishing a connection over the remote session communication protocol corresponding to the selected remote session browsing configuration. As discussed above with reference to FIGS. 8 and 9, the obtained initial processing result may include requested content with one or more processing actions performed by the network computing provider 107. Subsequent to obtaining the initial processing result, the client computing device 102 may perform any remaining processing actions on the initial processing result at block 1010.

At block 1012, the client computing device 102 displays the content corresponding to the processed initial processing result. For example, the client computing device 102 may display the processed client in the content display area 702 of a browser 700 as described in FIG. 7 above. In one embodiment, the processing result may only include display data corresponding to content displayed by a browser, and may not include display data corresponding to, for example, the interface controls of a browser instance at the NCC POP 142, the desktop of a virtual machine instance corresponding to the browse session, or any other user interface of the NCC POP 142. For example, the NCC POP 142 may process a Web page and associated content for display via RDP in a browser instance running in a virtual machine instance at the NCC POP 142. The browser instance may have one or more interface elements such as toolbars, menus, scroll bars, etc., in addition to the displayed Web page. The NCC POP 142 may send an RDP processing result corresponding to the displayed Web page only, without any of the interface elements associated with the browser. Illustratively, including an RDP processing result corresponding to the displayed Web page only may allow the browser at the client computing instance 102 to display the Web page by assembling the RDP processing result in the content display area of the browser without any further processing. In another embodiment, the RDP processing result may include a full virtual machine desktop and browser window corresponding to the full interface displayed at the NCC POP 142 browse session instance. The client computing device may automatically identify the area of the RDP processing result corresponding to the requested content, and may display only this area in the content display area of the browser.

At block 1014, the client computing device 102 processes local and remote user interactions. An illustrative routine for processing user interactions is provided below with reference to FIG. 11. At block 1016 the routine ends. Illustratively, a browse session instance instantiated by the network computing content provider 107 may terminate when a browser window or content display area is closed, may terminate when a remote session browse protocol is replaced by a parallel process at the client computing device 102, or may terminate in accordance with a timer or other event. Illustratively, if a browse session has terminated automatically due to a time-out but has associated content still displayed in a browser at the client computing device 102, later attempts by the user to interact with the content may result in a new browse session request being provided to the network computing and storage service provider 107 to start a new browse session according to the last state of the terminated session. Illustratively, terminating a remote browse session after a time-out may allow the network computing storage provider 107 to save computing resources at the NCC POP. In one embodiment, this process may be transparent to the user at client computing device 102, even though the remote browse session has been terminated during the intervening period.

Figure 11:
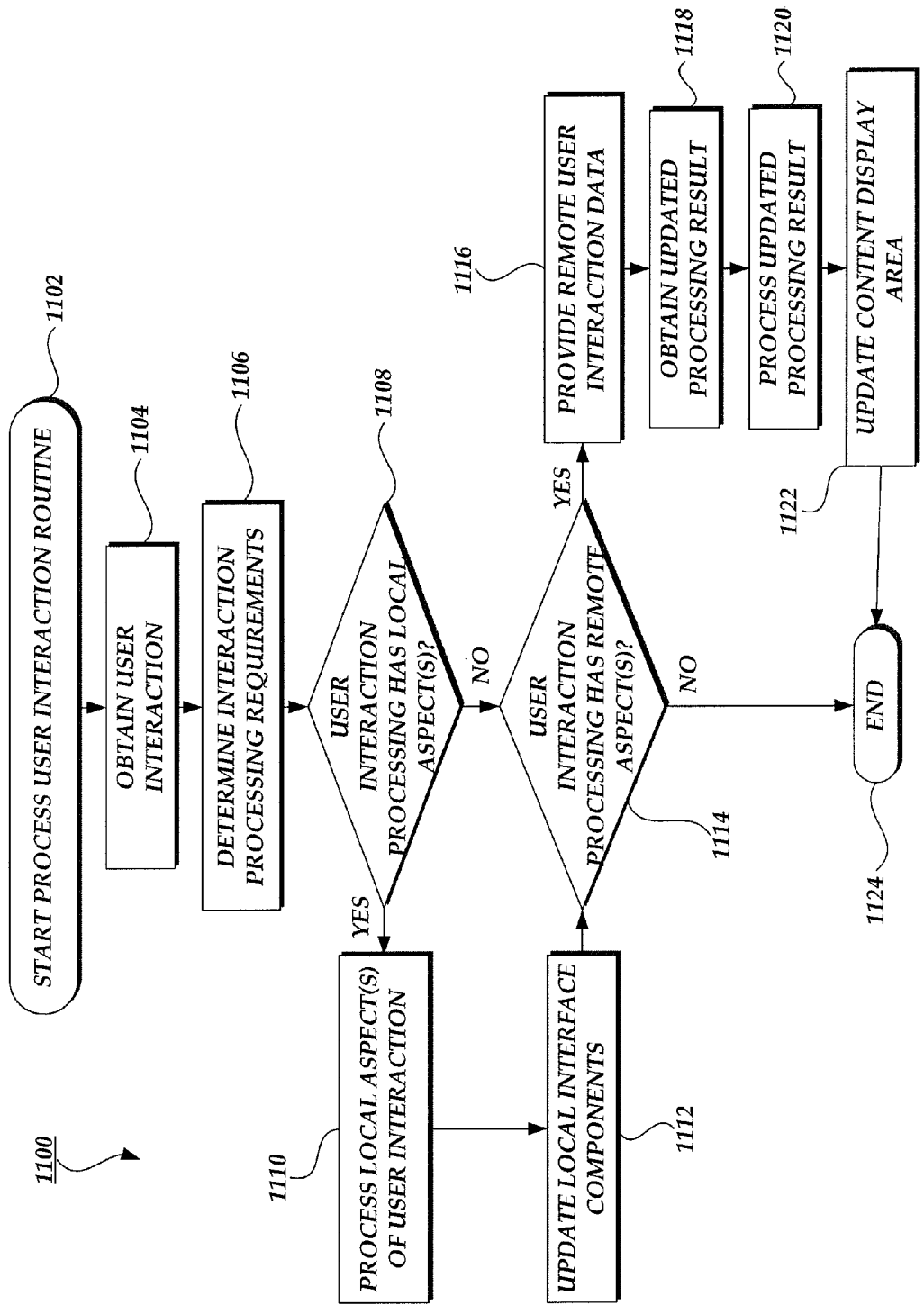
FIG. 11 is a flow diagram illustrative of a process user interaction routine implemented by a client computing device.

FIG. 11 is a flow diagram illustrative of a process user interaction routine 1100 implemented by a client computing device 102. Process user interaction routine 1100 begins at block 1102 in response to an interaction by a user. Illustratively, process user interaction routine 1100 may begin subsequent to the display of content in a content display area of a browser interface. For example, process user interaction routine 1100 may correspond to block 1014 of FIG. 10 above.

Illustratively, the displayed content may have one or more interactive elements, such as forms, buttons, animations, etc. User interaction with these interactive elements may require processing and display of updated content in the content display area. For example, selecting an element in a drop-down menu on a Web page may require processing and may change the configuration or visual appearance of the Web page or embedded resources. Illustratively, the processing required by user interaction with the displayed content may be handled as a local user interaction at the client computing device 102 or as a remote user interaction at the NCC POP 142 depending on the remote session browsing configuration in use. For example, if a remote session browsing configuration utilizing substantial local processing (e.g., sending unprocessed files over HTML), user interactions with displayed content may typically be handled as local user interactions at the client computing device 102. Illustratively, handling user interactions with displayed content as local user interactions at the client computing device 102 may allow for better responsiveness and fewer delays with simple user interactions (e.g., selection of a radio button, or typing text into a field), as interaction data corresponding to the interaction does not need to be sent to the NCC POP 142 for processing.

As a further example, if a remote session browsing configuration utilizing heavy remote processing of content (e.g., sending processed bitmap data over RDP) is being used as the remote session browsing configuration, all user interactions with displayed content may be handled as remote user interactions. For example, user input (e.g., keyboard inputs and cursor positions) may be encapsulated in RDP protocol data units and transmitted across network 108 to the NCC POP 142 for processing. Illustratively, the NCC POP 142 may apply the user interactions to the network content and transmit processing results consisting of updated bitmaps and interface data corresponding to an updated representation of the content back to the client computing device 102. Illustratively, handling user interactions with displayed content as remote user interactions at the NCC POP 142 may have a negative impact on interface responsiveness, as data is required to pass over the network and is limited by network latency; however, user interactions that require a substantial amount of processing may perform better when handled as remote user interactions, as the processing latency of the NCC POP 142 may be substantially lower than the processing latency of the client computing device 102.

In addition to a content display area for displaying network content, a browser may have one or more local interface components, such as toolbars, menus, buttons, or other user interface controls. Interactions with local interface components may be treated as local user interactions or remote user interactions depending on the processing required by the interaction and the remote session browsing configuration as further depicted in illustrative FIG. 7. For example, some local interface components may be managed locally by browser code running on the client computing device, while other local interface components may have one or more locally managed aspects (e.g., button click feedback, scroll bar redraw, etc), and one or more remote managed aspects treated as remote user interactions (e.g., page refresh, requesting a page at an address in an address bar, etc.)

At block 1104, the client computing device 102 obtains a user interaction from the user. This user interaction may be an interaction with local interface components as described in FIG. 7 and above, or may be an interaction with any interactive elements of the content displayed in the content display area of the browser, such as form fields, buttons, animations, etc. User interaction with these local interface components or interactive elements of displayed content may require local and/or remote processing depending on the nature of the component or element and the processing split specified by the remote session browsing configuration as described in FIG. 7 and above. At block 1106, the client computing device 102 determines the interaction processing requirements for the obtained user interaction. At decision block 1108, if the user interaction has local aspects (e.g., button click feedback, a change to a local browser state, a content element being processed at the client computing device, etc.) the routine 1102 moves to block 1110 to process the local aspect or aspects of the user interaction at the client computing device 102 and subsequently update the local interface components at block 1112. Illustratively, and as discussed above, aspects of the interaction and updating interface components and elements locally allows a browser to provide responsive user interfaces and content. Subsequent to processing local aspect(s) of the user interaction, or if the user interaction has no local elements (e.g., a user interaction with a content element displayed in the content display area when using a remote session browsing configuration processing entirely on the server side and utilizing an RDP remote session communication protocol) the routine 1102 moves to decision block 1114. If the user interaction has remote aspects that require processing, the routine 1102 moves to block 1116 and provides remote user interaction data to the network computing provider 107. Illustratively, in the case of a heavily server side remote session browsing configuration utilizing an RDP remote session communication protocol, the remote user interaction data may include input data such as a cursor position or keyboard input encapsulated in one or more RDP protocol data units. In some embodiments of remote session browsing configurations utilizing RDP or other remote session communication protocols, particular aspects of remote user interaction data such as cursor positions may be provided to the network computing provider 107 on a continuous basis, while in other embodiments of remote session browse configurations remote user interaction data may only be provided to the network computing provider 107 when associated with a user interaction that requires remote processing.

At block 1118, the client computing device 102 obtains an updated processing result from the network computing provider 107, the network computing provider 107 having processed the remote user interaction data to generate an updated representation of the content. At block 1120, the client computing device 102 performs any additional processing required on the updated processing result (based on the remote session browsing configuration) and at block 1122 displays the updated processing result in the content display area of the browser. At block 1124 the process user interaction routine 1102 ends. Illustratively, the routine may be executed again any number of times in response to further user interactions with the browser and displayed content.

Figure 12:
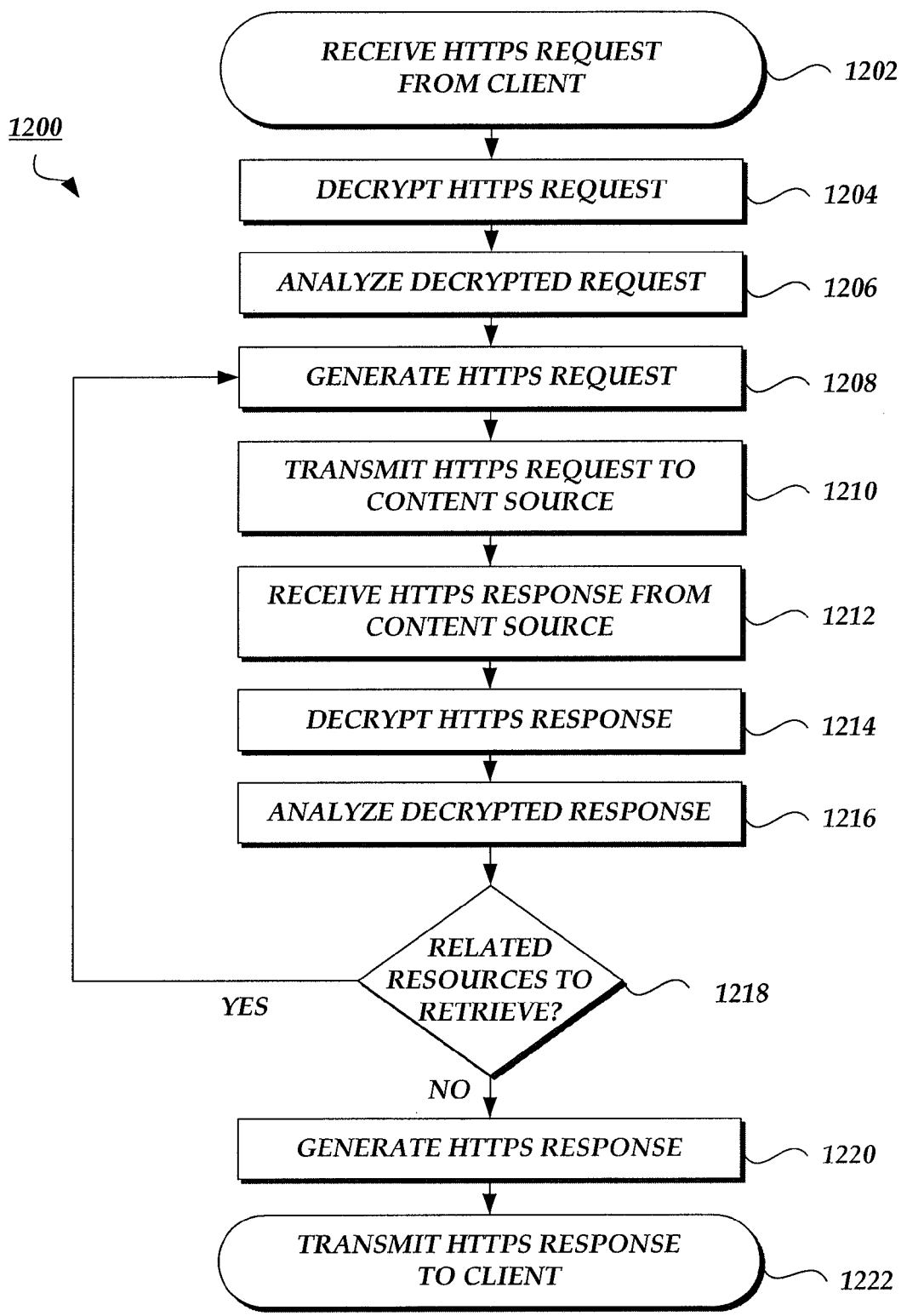
FIG. 12 is a flow diagram illustrative of a routine implemented by a virtual network computing provider for processing and responding to secure requests from a client computing device.

FIG. 12 illustrates a routine 1200 implemented by a virtual network computing provider 180 for receiving, processing, and responding to HTTPS requests from a client computing device 102. As described in detail above, a client computing device 102 can transmit HTTPS requests to a virtual network computing provider 180 in order to maintain control over the decrypted request data while still benefitting from a network computing provider 107 utilizing shared or parallel processing browsing configurations.

The routine 1200 begins at block 1202, when a virtual network computing provider 180 receives an HTTPS request from a client computing device 102. As described above, the HTTPS request can be transmitted directly to the virtual network computing provider 180. For example, a client computing device 102 can be part of a corporation with a private network through which all requests, including HTTPS requests, pass on their way to a content source. The corporation can lease, purchase, or otherwise obtain an exclusive or private area of the network computing provider 107, the exclusive or private area set up as a virtual network computing provider 180. The exclusivity can be maintained by the corporation, preventing third parties from accessing request data when it is at the virtual network computing provider 180. Therefore, encrypted request data, such as HTTPS requests, can be decrypted within the virtual network computing provider 180 without compromising the secure nature of the request. This allows advantageous use of the various components and methods described herein for determining browsing configurations and processing network resources whiles still limiting the possibility that the secure nature of the communications will be breached. For example, users of client computing devices 102 within the corporate network can request and access a web page of a secure business-to-business (B2B) web site, and the virtual network computing provider 180 can utilize a browsing configuration that shares processing of the B2B web site to improve the user experience, while ensuring that all communications accessible outside of the virtual network computing provider 180 remain encrypted and secure.

In some embodiments, an individual user of a client computing device 102 can obtain an exclusive or private area of the network computing provider 107, configured as a virtual network computing provider 180 in a manner similar to the corporation in the previous example. In such a case, the client computing device 102 can route all requests through the virtual network computing provider 180, where browsing configurations are determined and some amount of processing occurs. When the requests are HTTPS or other encrypted requests, they can be decrypted at the virtual network computing provider without exposing the unencrypted data to third parties because the virtual network computing provider can be under the control of the user of the client computing device 102. In some embodiments, only HTTPS requests are routed through the virtual network computing provider 180. In some embodiments, all requests are transmitted to the network computing provider 107, which can be configured to redirect HTTPS requests to the user's virtual network computing provider 180.

In some embodiments, content sources can obtain virtual network computing components 180 to process HTTPS requests. For example, one or more client computing devices 102 can be configured transmit requests to a network computing provider 107 for determination of a browsing configuration and advantageous processing of network resources, as described in detail above. Content providers 104, CDN service providers 106, and other content sources can obtain an exclusive virtual network computing provider 180 within the network computing provider 107. All HTTPS traffic from client computing devices 102 that target such a content provider 104 can be routed, by the network computing provider 107, to the content provider's 104 virtual network computing provider 180 so that the traffic can be decrypted without exposing the decrypted data to unauthorized third parties. The content provider 104 can control access to its virtual network computing provider 180. In some embodiments, the content provider 104 can also configure the operation of the virtual network computing provider 180, altering the types of browsing configurations utilized, etc.

As described above with respect to FIG. 2B, the client computing device 102 and the virtual network computing provider 180 perform a handshake procedure prior to exchanging encrypted HTTPS communications. During the handshake procedure, encryption and decryption keys are determined for use during the transmission and processing of the subsequent HTTPS communications. After the handshake procedure is complete, the virtual network computing provider 180 can receive an HTTPS request from the client computing device 102.

In response to receiving an HTTPS request from a client computing device 102, the routine 1200 can proceed to block 1204. At block 1204, the HTTPS request can be decrypted by one or more components of the virtual network computing provider 180. The decryption can be accomplished by utilizing the decryption key that was determined during the handshake procedure between the virtual network computing provider 180 and the client computing device 102. In some embodiments, the communication received in block 1202 is not an HTTPS request, but rather another type of secure or encrypted communication. Regardless of the type of communication, the virtual network computing provider 180 will typically use a decryption key in order to decrypt the communication before proceeding. In response to decrypting the communication, the routine 1200 can proceed to block 1206.

At block 1206, the unencrypted request data can be analyzed as described herein, and the virtual network computing device 180 can determine which network resource or resources to retrieve, and from which content source or sources, in order to respond to the request. The routine 1200 can then proceed to block 1208.

At block 1208, the virtual network computing device 180 can encrypt a request for the network resource requested by the client computing device 102. The request can be encrypted utilizing an encryption key that is determined during a handshake procedure between the virtual network computing provider 180 and the content source, as described above with respect to FIG. 3B. In response to encrypting the request, the routine 1200 can proceed to block 1210.

At block 1210, the virtual network computing provider 180 can transmit the encrypted request to the appropriate content source. For example, a client computing device 102 may request a web page from a secure B2B web site. After decrypting and processing the request from the client computing device 102 and creating a new encrypted request, the virtual network computing provider 180 can transmit the request to the content provider hosting the B2B web site. In some embodiments, the virtual network computing provider 180 can process the requested resource in parallel with the client computing device 102. In such cases, the virtual network computing provider 180 can also send an unprocessed copy of the original request from the client computing device 102 to the content source as though the request were transmitted directly from the client computing device 102.

At block 1212, the virtual network computing provider 180 can receive a response from the content source. For example, the virtual computing provider 180 may have transmitted a request to a secure B2B web site to view a web page associated with the account of the corporation managing the virtual network computing provider 180. The response from the content source may be the requested web page, transmitted in an HTTPS communication. The routine 1200 can then proceed to block 1214.

At block 1214, the virtual network computing provider 180 can decrypt the response received from the content source at block 1212. In the example above, the response is an HTTPS communication of a web page with account information. The page can be decrypted utilizing a decryption key that is determined during a handshake procedure between the virtual network computing provider 180 and the content source, as described above with respect to FIG. 3B. In response to decrypting the response, the routine 1200 can proceed to block 1216.

At block 1216, the virtual network computing provider 180 can analyze the decrypted response. The virtual network computing provider 180 can determine a browsing configuration to utilize in order to process the response. The browsing configuration can be determined as described in detail herein. Returning to the example above, the response is a web page with account information. The virtual network computing provider 180 can take on execution of computationally intense code in the web page, while the basic rendering can be done at the client computing device 102. When the response has been analyzed, the routine 1200 can proceed to decision block 1218.

At decision block 1218, the virtual network computing provider 180 can determine whether any resources related to the previously received resource should be retrieved. For example, a web page may require embedded resources, such as videos, images, documents, etc., which are to be retrieved from the same content or from one or more different content sources. In another example, the virtual network computing provider 180 is configured to predict which resources will requested next and to cache the predicted resources before they are requested so that they are available for immediate use when they are requested. If there are related resources to retrieve, the routine 1200 can return to block 1208 to generate requests for the related resources. Otherwise, execution of the routine 1200 can proceed to block 1220.

At block 1220, the virtual network computing provider 180 can generate a response to transmit to the client computing device 102. Returning to the B2B web page example above, the virtual network computing provider 180 can generate an encrypted response containing the portion of the web page that will be processed on the client computing device 102. The response can be encrypted utilizing an encryption key that is determined during a handshake procedure between the client computing device 102 and the virtual network computing provider 180, as described above with respect to FIG. 2B. In some embodiments, the virtual network computing provider 180 can process the requested resource in parallel with the client computing device 102. In such cases, the virtual network computing provider 180 can also send an unprocessed copy of the response from the content source to the client computing device 102 as though the response were transmitted directly from the content source. The routine 1200 can then proceed to block 1222.

At block 1222, the virtual network computing provider 180 can transmit to the client computing device 102 the response generated in block 1220, above. After the response is transmitted to the client computing device 102, the routine 1200 can end. Communication between the client computing device 102 and the virtual network computing provider 180, however, can continue. For example, the client computing device 102 may make additional requests to the virtual network computing provider 180, and those requests can cause initialization of the routine 1200, beginning at block 1202. Additionally, there may be other communications and interactions between the client computing device 102 and the virtual network computing provider 180. For example, the virtual network computing provider 180 may be processing the network resource in parallel with the client computing device 102 and receiving metrics from the client computing device 102 in order to monitor execution. The metrics can be transmitted to the virtual network computing provider 180 via an HTTPS transmission. Although such transmissions may not be requests, the general features of the routine 1200 can be utilized to facilitate the secure communication while allowing the virtual network computing provider 180 to analyze the communication.

While illustrative embodiments have been disclosed and discussed, one skilled in the relevant art will appreciate that additional or alternative embodiments may be implemented within the spirit and scope of the present invention. For example, the techniques described herein may be utilized, without departing from the scope of the present invention, to allow remote processing management in any number of other software applications and processes, including, but not limited to, image or video editing software, database software, office productivity software, 3d design software, audio and sound processing applications, etc. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with scope of variations to the present disclosure.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present Any process descriptions, elements, or blocks in the flow diagrams described herein and/or depicted in the attached FIGURES should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for trusted browsing comprising:
a network computing provider comprising a plurality of physical network computing devices, wherein individual physical network computing devices comprise hardware configurable to execute specific computing instructions, the network computing provider configurable to host one or more virtual network computing providers, each of the one or more virtual network computing providers logically separate from the rest of the network computing provider,
wherein at least one of the one or more virtual network computing providers is a private virtual network computing provider under control of a content provider separate from the network computing provider, the private virtual network computing provider configured to:
decrypt a first secure network communication received from a client computing device separate from both the network computing provider and the content provider;
communicate with the content provider on behalf of the client computing device by encrypting a second secure network communication for transmission outside of the network computing provider to the content provider, the second secure network communication based at least partly on the first secure network communication; and
redirect a subsequent secure network communication from the client computing device to the content provider without decryption by the private virtual network computing provider.

2. The system of claim 1, wherein secure network communications from the client computing device for content providers other than the content provider managing the private virtual network computing provider are not decrypted.

3. The system of claim 1, wherein secure network communications from the client computing device for content providers other than the content provider managing the private virtual network computing provider are redirected out of the private virtual network computing provider.

4. The system of claim 1, wherein the private virtual network computing provider comprises a network browsing component, the network browsing component in communication with a browsing component on the client computing device, the network browsing component configured to perform a first set of processing actions on a network resource requested by the client computing device in the first secure network communication.

5. The system of claim 4, the private virtual network computing provider further configured to:
transmit a secure response to the client computing device comprising a version of the requested network resource processed by the network browsing component according to the first set of processing actions,
wherein communicating with the content provider on behalf of the client computing device comprises retrieving the requested network resource from the content provider, and
wherein the browsing component on the client computing device is configured to cause display of the version by at least performing a second set of processing actions.

6. The system of claim 1, wherein the first secure network communication comprises an HTTPS request for a network resource, the HTTPS request transmitted by the client computing device.

7. The system of claim 1, wherein the second secure network communication comprises an HTTPS request for a network resource transmitted from the private virtual network computing provider.

8. The system of claim 7, wherein the private virtual network computing provider is further configured to receive, from the content provider, an HTTPS response comprising the network resource requested by the client computing device.

9. The system of claim 8, wherein the network resource is one of a web page, image, video, applet, or document.

10. The system of claim 1, wherein the secure network communications comprise tunneled communications.

11. A system for trusted browsing comprising:
a network computing provider comprising a plurality of physical network computing components, wherein individual physical network computing components comprise hardware configurable to execute specific computing instructions, the network computing provider configurable to host one or more virtual network computing providers, each of the one or more virtual network computing providers logically separate from the rest of the network computing provider, wherein at least one of the one or more virtual network computing providers is a private virtual network computing provider managed by an operator of one or more client computing devices, the private virtual network computing provider configured to:

decrypt a first secure network communication received from a first client computing device of the one or more client computing devices, the first client computing device separate from both the network computing provider and a content provider;

communicate with the content provider on behalf of the first client computing device by encrypting a second secure network communication for transmission outside of the network computing provider to the content provider, the second secure network communication based at least partly on the first secure network communication; and redirect a subsequent secure network communication from the client computing device to the content provider without decryption by the private virtual network computing provider.

12. The system of claim 11, wherein secure network communications from client computing devices other than the one or more client computing devices operated by the manager of the private virtual network computing provider are not decrypted.

13. The system of claim 12, wherein secure network communications from client computing devices other than the one or more client computing devices operated by the manager of the private virtual network computing provider are redirected out of the private virtual network computing provider.

14. The system of claim 11, wherein the private virtual network computing provider comprises a network browsing component, the network browsing component in communication with a browsing component on the first client computing device, the network browsing component configured to perform a set of processing actions on a network resource requested by the first client computing device in the first secure network communication.

15. The system of claim 14, the private virtual network computing provider further configured to:

transmit a secure response to the first client computing device comprising a version of the requested network resource processed by the network browsing component according to the set of processing actions, wherein communicating with the content provider on behalf of the first client computing device comprises retrieving the requested network resource from the content provider, and wherein the browsing component on the first client computing device is configured to cause display of the version by at least performing a second set of processing actions.

16. The system of claim 11, wherein the first secure network communication comprises an HTTPS request for a network resource.

17. The system of claim 11, wherein the second secure network communication comprises an HTTPS request for a network resource transmitted from the private virtual network computing provider.

18. The system of claim 17, wherein the private virtual network computing provider is further configured to receive, from the content provider, an HTTPS response comprising the network resource requested by the first client computing device.

19. The system of claim 17, wherein the network resource is one of a web page, image, video, applet, or document.

20. The system of claim 11, wherein the secure network communications comprise tunneled communications.

* * * * *